United States Patent [19]
Gui et al.

[11] Patent Number: 5,742,518
[45] Date of Patent: Apr. 21, 1998

[54] STICTION MODEL FOR A HEAD-DISC INTERFACE OF A RIGID DISC DRIVE

[75] Inventors: Jing Gui, Fremont; Bruno Marchon, Palo Alto, both of Calif.

[73] Assignee: Seagate Technology, Inc., Scotts Valley, Calif.

[21] Appl. No.: 676,718

[22] Filed: Jul. 8, 1996

Related U.S. Application Data

[60] Provisional application No. 60/003,319 Sep. 6, 1995 and provisional application No. 60/001,975 Jul. 28, 1995.

[51] Int. Cl.⁶ .................................................. G01D 3/028
[52] U.S. Cl. ............................................ 364/508; 360/105
[58] Field of Search .............................. 364/508; 360/105, 360/119, 121, 131, 135; 73/10, 54.14

[56] References Cited

U.S. PATENT DOCUMENTS 5,289,387  2/1994  Higo et al. ............................... 364/508

OTHER PUBLICATIONS

J.A. Greenwood and J.B.P. Williamson, "Contact of Nominally Flat Surfaces," Burndy Corporation Research Division, Apr. 1966, pp. 300–319.

Bowden, et al., "The Friction and Lubrication of Solids," Oxford Press, 1986, pp. 299–307.

M.J Matthewson and H.J. Mamin, "Liquid Mediated Adhesion of Ultra–Flat Solid Surfaces," Met Res Soc Proc, vol. 119, 1988, pp. 87–92.

Naum V. Gitis, et al., "Long–Term Stiction at the Magnetic Thin–Film Disk–Slider Interface," Adv. Info. Storage Syst., vol. 3, 1991, pp. 91–105.

Hong Tian and Takeo Matsudaira, "The Role of Relative Humidity, Surface Roughness and Liquid Build-Up on Static Friction Behavior of the Head/Disk Interface," Hoya Electronics Corporation, Oct. 1992, pp. 1–10.

Chao Gao, et al., "A Meniscus Model for Optimization of Texturing and Liquid Lubrication of Magnetic Thin–Film Rigid Disks," Tribology Transactions, vol. 38 (1995), pp. 201–212.

Yufeng Li and Frank E. Talke, "A Model for the Effect of Humidity on Stiction of the Head/Disk Interface," Seagate Technology, pp. 79–84.

Primary Examiner—Emanuel T. Voeltz
Assistant Examiner—Thomas Peeso
Attorney, Agent, or Firm—Flehr Hohbach Test Albritton & Herbert LLP

[57] ABSTRACT

A quantitative stiction model for HDI has been proposed, which takes into account local redistribution of lubricant and its effect on meniscus formation. Equations for calculating stiction have been obtained for three distinct situations, depending on the ratio of the interface separation to the lubricant film thickness and the interactions among contacting asperities. The model has been applied to HDIs consisting of either regular or random texture. The model predicts that the relationship between stiction and the real area of contact is not necessarily monotonic. Instead, stiction exhibits a broad minimum for intermediate values of true contact. This prediction is consistent with some of the experimental results reported in the literature. The model also suggests that the role of various roughness parameters on stiction are not independent of one another. To minimize stiction and maximize reliability under a given flyability constraint, the asperity height, radius and density need to be considered simultaneously.

16 Claims, 17 Drawing Sheets

STICTION MODEL FOR A HEAD-DISC INTERFACE OF A RIGID DISC DRIVE

This application is a continuation of Provisional patent application Ser. No. 60/003,319 filed Sep. 6, 1995 entitled, "Stiction Model for a Head-Disc Interface of a Rigid Disc Drive" and Provisional patent application Ser. No. 60/001,975 filed Jul. 28, 1995 entitled "Optimization of the Bump Spacing on Patterned Texture of Thin Film Media".

BACKGROUND OF THE INVENTION

In a hard disc drive, the disc is rotated at a constant speed by a spindle motor which supports the disc at its center, the rotation of the disc creating a film of air over the surface of the disc. An actuator is provided adjacent the disc, supporting a transducer which reads and writes data on the surface of the disc. The transducer, which is incorporated into or supported on a slider, "flies" over the surface of the disc, supported on this thin film of air. The data is stored on defined concentric tracks on the surface of the disc. The ability to maximize storage of data on the disc is a function, in part, of the ability to fly the transducer very close to the surface of the disc so that the dispersion of the interaction between transducer and disc surface at each data transition point is minimized.

In order to allow lower and lower flying heights, the disc surface must be made smoother and smoother. However, the disc surface cannot be made perfectly smooth because of the need, among other reasons, to avoid what is termed "stiction". For a head disc interface (HDI), stiction can be defined as the lateral force that needs to be overcome to separate the slider from the surface of the disc. For example, in most disc drives, when the disc stops rotating because the disc drive is out of use, then the slider is no longer supported on the film of air and lands on the surface of the disc. If the disc surface is too perfectly smooth, then because of the affect of stiction, when the spindle motor is to be started up again so that the transducer resumes flying over the surface of the disc, the head or transducer cannot be broken free from the surface of the disc but remains "stuck" to the surface of the disc.

In the presence of liquid lubricant on the disc which is introduced mainly to reduce wear during the contact start/stop (CSS), stiction is even higher than when no liquid is present at the surface. Consequently, much of the challenge for the tribology of the head disc interface lies in defining an interface that will show both low wear from the head landing on or periodically contacting the surface of the disc and low stiction so that the rotation of the disc can be restarted after the disc has been stopped.

In the past decade or so, the magnetic storage industry has made tremendous progress in defining the interface in order to keep up with the pace of the continuing trend toward higher storage capacity through lowering the flying heights of read/write heads over discs. However, as the disc surface becomes smoother, the task of defining the head disc interface becomes more difficult. Thus, the need for a better understanding of the stiction phenomenon on a fundamental ground, and corresponding quantitative (instead of qualitative) models for defining Head Disc Interface (HDI) stiction becomes more ever pressing.

In the literature, there exist abundant experimental studies on the HDI stiction phenomenon. Factors that affect stiction of an HDI include head load, slider size, surface roughness, geometrical conformity (as measured by crown) between slider and disc, physical and chemical properties of lubricants and lubricant film thickness, physical and chemical properties of slider and disc overcoat materials, and environmental factors such as temperature and humidity. Relatively speaking, theoretical studies on HDI stiction are rare, and are mainly focused on roughness aspects. The concepts of disjoining and capillary pressure have been applied by C. M. Mate, J. Appl. Phys. 72(7), 3084 (1992), to the analysis of how liquid lubricants behave on magnetic disc surfaces, but a quantitative stiction model that incorporates such key concepts has yet to emerge.

Several studies have contributed to the understanding of stiction as a contact phenomenon at head-disc interfaces. It is now understood that the increase in stiction in the presence of a liquid lubricant is a direct result of the meniscus effect of the liquid. When two surfaces, separated by a layer of liquid lubricant film, are brought into contact, the lubricant tends to wet both surfaces, forming menisci around contacting points due to surface energy effect. The pressure inside a meniscus is lower than outside, which results in an additional normal force, the meniscus force, pulling two mating surfaces closer together. Stiction typically shows a significant time dependence, the longer the head rests in the disc, the higher the stiction.

To calculate the stiction arising from the meniscus force for an HDI, several models have been proposed. A good summary on these models may be found in a recent study by C. Gao, X. Tian, and B. Bhushan, Tribol. Trans., vol. 38, 2nd ed., p.201 (1995). All these models employed roughly the same treatment a model to calculate the adhesive force for a single isolated meniscus under specific geometrical constraints, plus an incorporation of the Greenwood-Williamson's statistical treatment of surface roughness, J. A. Greenwood and J. P. B. Williamson, Proc. Roy. Soc. London A295, 300 (1966). The differences among these various studies lie largely on the models adapted or proposed for the calculation of adhesive force for a single meniscus. For example, the models proposed by F. P. Bowden and D. Tabor, "The Friction and Lubrication of Solids," Clarendon Press (1986), for an isolated contacting asperity, and by J. N. Israelachvili, "Intermolecular and Surface Forces," Academic Press (1985) for an isolated non-contacting asperity have been used by Y. Li and F. Talke, Tribol. Mech. Magn. Stor. Syst. Vol. VII, STLE Special Publ. SP-29, 79 (1990) and by N. V. Gitis, L. Volpe, and R. Sonnenfeld, Adv. Inf. Stor. Syst. 3, 91 (1991). A model based on lubricant displacement around the contacting asperity has been proposed by H. Tian and T. Matsudaira, J. Tribol. 115(1), 28 (1993). More recently, C. Gao, X. Tian, and B. Bhushan, Tribol. Trans. (cited above), have proposed another model for calculating the adhesive force for a single meniscus between a lubricated flat and an unlubricated sphere based on surface energy considerations. Their result is different from that obtained by Tian and Matsudaira by a factor of two, but agrees with Bowden and Tabor's experiment results for a single asperity, F. P. Bowden and D. Tabor, "The Friction and Lubrication of Solids," Clarendon Press (1986).

Intentionally or not, two assumptions are invariably found in all the aforementioned models. First, the lubricant film thickness in the non-contacting area remains constant, and is always equal to the original lubricant film thickness. Second, the geometry of a single meniscus is always treated as a sphere against a flat, as shown in FIG. 1A. Unfortunately, neither of these two assumptions may be representative of the situation within an HDI. The studies by Mate have clearly demonstrated that whenever head-disc contact occurs, lubricant redistribution has to occur in order to maintain equilibrium between the axillary pressure inside menisci and the disjoining pressure of the lubricant film outside menisci. The driving force for liquid lubricant to be drawn from surrounding area to join the meniscus can be enormous. For example, as pointed out by Mate, if a disc is to be lubricated with only 2 nm of a perfluoropolyether (PFPE) type of liquid lubricant, there exists a large thermodynamic driving force for the lubricant to fill the gap between the head and the disc. As a result of such local lubricant redistribution, the growth of a meniscus is likely to go beyond the point of the total immersion of the contacting asperity, as shown in FIGS. 1B and 1C. Under such circumstances, the geometry of a meniscus can no longer be treated as a sphere against a flat. Following Mathewson and Mamin, it is convenient to consider stiction for three distinctly different regimes. i.e., "toe dipping", "pill-box" and "flooded" as shown in FIGS. 1A, 1B and 1C respectively, depending on the ratio of the mean interplanar separation of the interface to lubricant thickness. Evidently, only within the "toe dipping" regime, could one legitimately treat an individual meniscus as that to exist between a sphere and a flat. As will be discussed later, in today's disc drives, most HDI's are operating within the "pill-box" regime in order to achieve a good compromise between wear and stiction. Nevertheless, none of the existing stiction models is adequate for describing the stiction within this regime.

SUMMARY OF THE INVENTION

A quantitative stiction model for HDI has been proposed, which takes into account local redistribution of lubricant and its effect on meniscus formation. Equations for calculating stiction have been obtained for three distinct situations, depending on the ratio of the interface separation to the lubricant film thickness and the interactions among contacting asperities, namely the "toe dipping" regime, and the "pillbox" regime with or without interactions among asperities. The model has been applied to HDIs consisting of either regular or random texture. An important prediction from this model is that the relationship between stiction and the real area of contact is not necessarily monotonic. Instead, stiction exhibits a broad minimum for intermediate values of true contact. This prediction is consistent with some of the experimental results reported in the literature. The model also suggests that the role of various roughness parameters on stiction are not independent of one another. To minimize stiction and maximize reliability under a given flyability constraint, the asperity height, radius and density need to be considered simultaneously. In the case of a random texture, under the same flyability constraint which limits the maximum allowable asperity height, a reduction in the standard deviation of the asperity height distribution leads to a reduction in stiction. Consequently, under the same constraint a regular texture should always be superior to a random texture in terms of stiction.

The model has also been used to examine the effects of lubricants, the disc overcoat the interactions between them. To ensure low stiction, a good approach is to maintain the HDI within the "toe dipping" regime. But this approach may not always be possible because of other tribology constraints such as wear durability. Lubricant film thickness needs to be optimized to minimize stiction while maintaining good wear resistance. In addition, the physical and chemical properties of a lubricant, as well as its interactions with the disc overcoat and slider materials, play very crucial roles in determining stiction. Since stiction results mainly from meniscus build-up around contacting asperities, it should depend strongly on the speed of lubricant migration. Consequently, reducing the lubricant mobility should be an effective way to suppress stiction. This model can also be applied to study the effects of the head variables on stiction. These effects may include form factor, crown, and the head pre-load.

BRIEF DESCRIPTION OF THE DRAWINGS

The following invention will be best understood from the following description of a preferred embodiment and accompanying example given with respect to the following figures.

DESCRIPTION OF THE PREFERRED EMBODIMENT

Figure 1A:
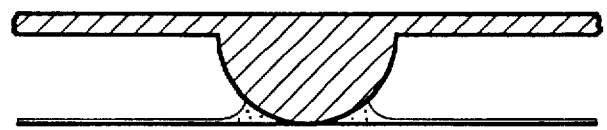
FIGS. 1A, 1B, 1C and 1D which illustrate three regimes of the relationship for lubricant redistribution between a disc and slider, referred to as "toe dipping," "pillbox," and "flooded" respectively.
Figure 1B:
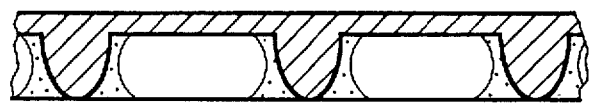
Figure 1C:

The following is a description of the critical elements of an analytical, quantitative algorithm for deferring stiction in a disc device as a function of various other parameters which may be modified by the disc drive manufacturers and other parameters such as available motor torque are defined by the designers of the disc drive; they are typically not subject to modification by the disc manufacturers, but are accounted for in this algorithm, which thereby accurately represents the overall system.

Ignoring the van der Waals force between two contacting solid surfaces (negligibly small compared to either the meniscus force or the applied load), the pseudo-equilibrium normal force for the slider, after sufficiently long rest, is $$P = F_m + W \quad (1)$$

where P is the deformation response force, $F_m$ is the meniscus force, and W is the applied load.

In its most general form $$P = N \int_h^\infty p(z)\phi(z)dz \quad (2)$$

where N is the total number of apserities under a slider, h is the slider-disc separation, $\phi(z)$ is the asperity height distribution, meaning that the probability that a particular asperity has a height between z and z+dz above some reference plan will be $\phi(z)dz$, and p(z) is the deformation response from a single contacting asperity, namely, $$p(z) = \int_s \int \sigma_z ds \quad (3)$$

where $\sigma_z$ is the normal stress on the contacting asperity, and S is the contacting area. If $P_m$ is the meniscus pressure on a single contacting asperity and $A_m$ is the area of the meniscus, the total meniscus force $F_m$ is $$F_m = N \int_{h-d}^\infty P_m A_m \phi(z) dz \quad (4)$$

where d is the lubricant film thickness at equilibrium. Substituting Eqs (2) and (4) into Eq (1) results in $$N \int_h^\infty p(z)\phi(z)dz = N \int_{h-d}^\infty P_m A_m \phi(z)dz + W \quad (5)$$

Both h and d are changing during the loading process. When the applied load brings the slider and disc into contact, menisci start to form at contacting points. Accompanying the meniscus formation is an additional loading resulted from the meniscus force. This additional loading in turn brings more asperities into contact, hence resulting in further meniscus formation and higher loading. This seemingly perpetual process will eventually come to a halt because the lubricant supply is finite. To form menisci, the lubricant has to be drawn from the area surrounding the contacting asperities. This process results in thinning of the lubricant films around the contacting asperities. As the lubricant film thins, the disjoining pressure associated with the lubricant film increases, which makes it more and more difficult for a meniscus to draw lubricant from its surrounding area. Eventually, it reaches a (quasi-)equilibrium state at which the disjoining pressure of the film equals the capillary pressure of the meniscus, i.e., $$\frac{A_H}{6\pi d^3} = \frac{\gamma}{r} \quad (6)$$

where $A_H$ is Hamaker constant, $\gamma$ is the surface tension of the lubricant, and r is the radius of the meniscus. In Eq (6), it has been assumed that the contact angle between the lubricant and either solid is zero, which is a good approximation for most PFPE-type of lubricants on either carbon or common head materials such as $Al_2O_3$/TiC. We will continue to use this approximation unless otherwise specified.

Yet, there is another constraint that the total volume of the lubricant has to be conserved during the process of meniscus formation. Assuming that $v_m$ is the volume of the lubricant forming a meniscus, A is the total area of the slider, and $D_o$ is the original lubricant film thickness, one can express this condition as $$A d_0 = N \int_{h-d}^\infty v_m \phi(z)dz + \left[ A - N \int_{h-d}^\infty A_m \phi(z)dz \right] d \quad (7)$$

Eqs (5) to (7) are three fundamental equations for calculating the total normal force P. Once P is known, the stiction, F, is simply $$F = \mu P = \mu(F_m + W) \quad (8)$$

where $\mu$ is the coefficient of friction.

To carry out the calculation, one needs to make assumptions on the contact geometries and the distribution of the asperities.

To create a random texture, one must make certain assumptions on the shape and height distributions of the texture. Following Greenwood and Williamson's model, asperity summits can be treated as a Gaussian distribution of semi-spheres of same radius R.

$$\phi(z) = \frac{1}{\sqrt{2\pi}\,\sigma} \exp\left[ -\frac{(z-z_0)^2}{2\sigma^2} \right] \quad (9)$$

Based on their model, the deformation response force on a single contacting asperity can be readily obtained $$p(z) = \frac{4}{3} ER^{\frac{1}{2}} (z-h)^{\frac{3}{2}} \quad (10)$$

where E is the composite Young's modulus of the two solids.

When the roughness of a head-disc interface is sufficiently high and/or the lubricant film thickness is sufficiently low such that $h > (12\pi\gamma d^3/H_H)$ (ref. to Eq(6)), the junction is in the so-called "toe dipping" regime, as shown schematically in FIG. 1A. In this regime, a lubricant film cannot bridge across the gap between the head and the disc. For a PFPE type of lubricant film of 2 nm in thickness, h should be in excess of 75 nm, which is much rougher than most of the advanced head-disc interfaces.

Figure 2A:
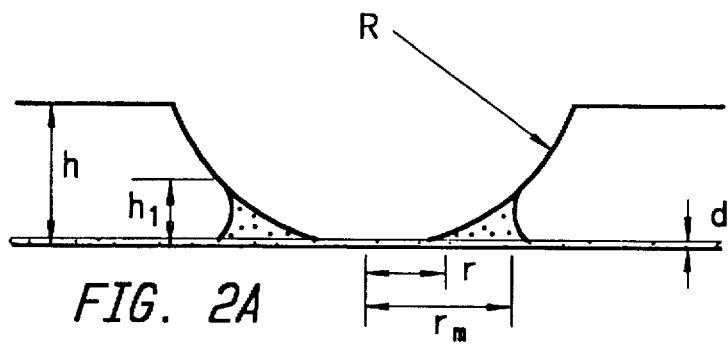
FIGS. 2A, 2B and 2C are diagrams which may be used to mathematically analyze the toe dipping regime (FIG. 2A) and the pillbox regime (FIGS. 2B and 2C)

In this regime, $P_m$, $A_m$ and $v_m$ can be calculated from the geometry of the asperity, as shown in FIG. 2A, using the following relationships, for R>>h, $h_1$, $$r_m^1 = 2R[h_1 + (z-h)]$$

$$r^2 = 2R(z-h) \quad (11)$$

where $h_1$ is the height of the meniscus, and $$h_1 = \frac{12\pi\gamma}{A_H} d^3 = ad^3 \tag{12}$$

where $a = 12\pi\gamma/A_H$. Therefore, $$P_m = \frac{2\gamma}{h_1}, \tag{13}$$

$$A_m(z) = \pi(r_m^2 - r^2) = 2\pi R h_1, \tag{14}$$

and $$v_m = \pi r_m^2 h_1 - \frac{1}{6} \pi h_1 [3(r_m^2 + r^2) + h_1^2] = \pi R h_1^2 \tag{15}$$

One may notice that $P_m$, $A_m$ and $v_m$ are independent of z. In other words, the capillary pressure, the area and the volume of a meniscus are all independent of the penetration depth of a contacting asperity. Substituting Eqs (9), (10) and Eqs (12)–(15) into Eqs (4)–(7), one has $$\frac{4}{3} NER^{\frac{1}{2}} \Phi_{\frac{3}{2}}(h) = 4\pi NR\gamma\Phi_0(h-d) + W \tag{16}$$

and $$A(d_0-d) = \pi NRad^3(ad^3 - 2d)\Phi_0(h-d) - 2\pi NR\phi_1(h-d) \tag{17}$$

where the function $\Phi_n(x)$ is defined as $$\Phi_n(x) = \int_x^\infty (z-x)^n \phi(z) dz \tag{18}$$

The Eqs (16) and (17) can be solved simultaneously to obtain h and d. Once h and d are known, Eq (8) is used to calculate stiction. It is interesting to note that Eq (16) has essentially the same form as Gao et al.'s model except that in their expression the lubricant film thickness, d, is a constant, namely, the original lube thickness, instead of a variable.

In the "pillbox" regime, a lubricant film is thick enough to bridge across the gap between the head and the disc, causing local "flooding" around contacting asperities. The only reason that the entire gap is not all flooded is that the total volume of the lubricant film is limited. Within this regime, there can be two different situations that require different treatments. In one case, contacting asperities are well separated such that the formation of a meniscus around one asperity has no influence on the formation of a meniscus around another asperity. In other words, menisci are all independent of each other. In the other case, contacting asperities are close enough such that they interfere with each other during meniscus formation by competing for lubricant supply.

Figure 2B:
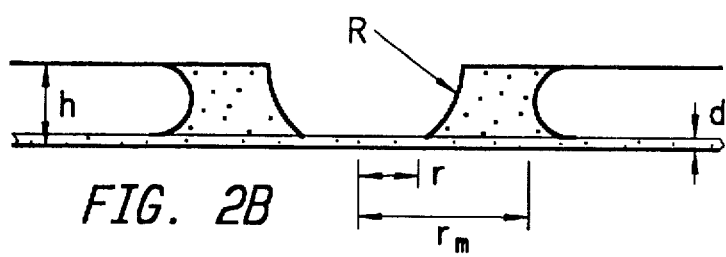

In the case of no interference, each meniscus will grow to its full potential. The size of a meniscus is determined solely by the separation of the gap, H, and the lubricant film thickness, D, both of which should be the same everywhere. Hence, the size of a meniscus should be the same for all the contacting asperities. Furthermore, since the volume of a meniscus is much larger than that of an asperity, as shown in FIG. 2B, to a good approximation one has $v_m \vee A_m h - \pi R h^2$. Let us define $$A_M = N \int_{h-d}^\infty A_m \phi(z) dz, \tag{19}$$

and $$V_M = N \int_{h-d}^\infty v_m \phi(z) dz = hA_M - N\pi Rh^2 \tag{20}$$

where $A_M$ and $V_M$ are the total area and volume of menisci, respectively. Obviously, in the "pillbox" regime, the capillary radius is simply one half of the head-disc separation, i.e., $$P_m = \frac{2\gamma}{h} \tag{21}$$

The substitution of Eqs (19) to (21) into Eqs (4) to (7) yields $$\frac{4}{3} NER^{\frac{1}{2}} \Phi_{\frac{3}{2}}(h) = \frac{2\gamma}{h} A_M + W, \tag{22}$$

$$\frac{d_0 - d}{h - d} + \frac{N\pi Rh^2}{A(h-d)} = \frac{A_M}{A}, \tag{23}$$

and $$d = \left(\frac{h}{a}\right)^{\frac{1}{3}} \tag{24}$$

Combining Eqs (22), (23) and (24) gives $$d_0 = \left(\frac{h}{a}\right)^{\frac{1}{3}} - \frac{N\pi Rh^2}{A} + \frac{h}{2\gamma A}\left[h - \left(\frac{h}{a}\right)^{\frac{1}{3}}\right]\left[\frac{4}{3} NER^{\frac{1}{2}} \Phi_{\frac{3}{2}}(h) - W\right]. \tag{25}$$

For a given lubricant thickness, h can be obtained by solving Eq (25), which can then be used to calculate the stiction using Eq (8).

Figure 2C:
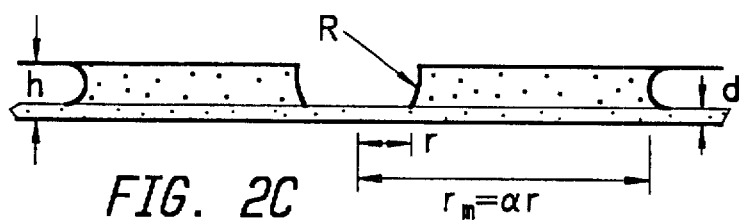

In the case of interference, contacting asperities are sufficiently close to each other such that they compete for lubricant during the meniscus formation. The higher an asperity is, the earlier it gets into contact, thus, the earlier it starts to draw lubricant to form a meniscus around itself. When a neighboring asperity of lower height starts to get into contact, the lubricant film thickness is already lower than the original value. Therefore, only a smaller meniscus will be formed around this asperity. Again, the formation of a meniscus around this contacting asperity will further deplete the supply of lubricant within the area, leading to an even smaller meniscus around a later contact. Under such a situation, the size of a meniscus depends on the state of contact. The larger the contact area, the larger the meniscus. Let us assume that the radius of a meniscus forming around a contacting asperity is directly proportional to the radius of the contact area, namely $$r_m = \alpha r \tag{26}$$

where $\alpha$ is a constant. With this assumption, $A_m(z)$ and $v_m(z)$ can be readily found based on the geometries of the asperity and the meniscus, as shown in FIG. 2C.

$$A_m(z) = \pi(\alpha^2 - 1)r^2 = 2\pi R(\alpha^2 - 1)(z-h) \tag{27}$$

and $$v_m(z) = \pi\alpha^2 r^2 h - \frac{1}{6}\pi h[3(r_1^2 + r^2) + h^2] = \qquad (28)$$
$$= 2\pi\alpha^2 Rh(z-h) - \pi Rh(2z-h)$$

Substituting Eqs (27) and (28), plus Eq (21) into Eqs (4) to (7), one obtains a set of equations of solving h and d.

$$\frac{4}{3} NER^{\frac{1}{2}} \Phi_{\frac{3}{2}}(h) = \frac{4\pi NR\gamma}{h}[\alpha^2\Phi_1(h-d) - \Phi_1(h)] + W. \qquad (29)$$

$$A(d_0-d) = 2\pi NR\alpha^2(h-d)\Phi_1(h-d) - \pi NRh\psi(h), \qquad (30)$$

and $$d = \left(\frac{h}{a}\right)^{\frac{1}{3}} \qquad (31)$$

where the function $\psi(x)$ is defined as $$\Psi(x) = \int_x^\infty (2z - x)\phi(z)dz \qquad (32)$$

Combining Eqs (29), (30) and (31) gives $$d_0 = \left(\frac{h}{a}\right)^{\frac{1}{3}} + \left[h - \left(\frac{h}{a}\right)^{\frac{1}{3}}\right] \left\{ \frac{h}{2\gamma A} \left[\frac{4}{3} NER^{\frac{1}{2}} \Phi_{\frac{3}{2}}(h) - W\right] + 2\pi NR\Phi_1(h) \right\} - \pi NRh\Psi(h) \qquad (33)$$

For a given applied lubricant film thickness, Eq (33) can be used to solve h, which then can be used to calculate the stiction.

A regular texture is defined as arrays of bumps with the same shape and same height, H. The asperity peak height distribution in this case can be closely approximated by a delta function, i.e., $$\phi(z) = \delta(z-H). \qquad (34)$$

With this kind of distribution, the calculation is greatly simplified. Again, each lube regime will be treated separately.

In the "toe dipping" regime, assuming that the bump summits are spherical, the total meniscus force, $F_m$, is simply $$F_m = 4\pi NR\gamma, \qquad (35)$$

which is directly proportional to the radius of the asperities, and to the total number of asperities under the slider. However, it is independent of the asperity height and the applied lubricant thickness, provided that the lubricant film is sufficiently thin and the asperity is sufficiently high such that the assumption that the interface is inside the "toe dipping" regime holds true. Assuming $\gamma=25$ mN/m, R=25 μm, and N=5000 (10×10 μm spacing for a slider area of 0.5 mm²), the total meniscus force is only 39 mN, which is comparable to, or, in some cases, less than the applied load. By comparing Eq (35) and Eq (16), one can also see that, within the "toe dipping" regime, the meniscus force is always higher for a regular texture than it is for a random texture, provided that the density of asperities is the same. In fact, within this regime, total meniscus force is determined by the total number of contacting asperities. As regular texture experiences a higher meniscus force because all the asperities are in contact. Yet, based on the above estimation, the total meniscus force is quite limited even for the case of a regular texture. One may conclude that in the "toe dipping" regime, the meniscus contribution to stiction is not very significant.

In the "pillbox" regime, for semi-spherical bumps, one can substitute Eq (34) directly into Eq (25). The equations to solve h are reduced to $$d_0 = \left(\frac{h}{a}\right)^{-\frac{1}{3}} - \frac{N\pi Rh^2}{A} + \qquad (36)$$
$$\frac{h}{2\gamma A}\left[h - \left(\frac{h}{a}\right)^{\frac{1}{3}}\right]\left[\frac{4}{3} NER^{\frac{1}{2}}(H-h)^{\frac{3}{2}} - W\right],$$

In the literature, quantitative experimental stiction data for a regular texture are available only for square-shaped bumps. It is, therefore, desirable to derive equations applicable to this particular geometry. For square bumps, Eq (25) needs to be modified because p(z) has a different form from Eq (10). Assuming the width of a square bump is b, and the separation between bumps is B, $$p(z) = E\frac{b^2(z-h)}{z}, \qquad (37)$$

and the equation for solving h becomes $$d_0 = \left(\frac{h}{a}\right)^{\frac{1}{3}} + \qquad (38)$$
$$\left[h - \left(\frac{h}{a}\right)^{\frac{1}{3}}\right]\left[\frac{h}{2\gamma A}\left(AE\beta\frac{H-h}{H} - W\right) - \beta\right]$$

where $\beta = b^2/B^2$.

In the following, numerical results based on the above equations will be derived. Texture parameters will be investigated in the following ranges: asperity height H=5–35 nm; bump spacing 5–70 μm; asperity radius of curvature R=10–100 μm. The materials used will be as follows: overcoat Young's modulus E=160 Gpa; the coefficient of friction μ=0.2; lubricant surface tension $\gamma=25$ mJ/m² and Hamaker constant $A_H=10^{-19}$. Slider effective area of contact will be taken as A=0.5 mm². This value is slightly lower than for a micro-slider (50% form factor) which has a typical value in the range 0.8– 1.0 mm². This "effective" value was arbitrarily chosen to take into account long wavelength geometrical effects such as crown, camber, twist and waviness.

Figure 1D:
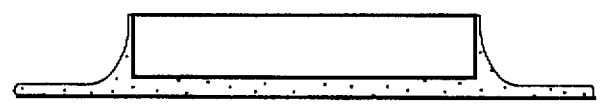

As discussed earlier, the risk for high stiction is low when the interface is in the toe-dipping regime, and high when in the pill-box regime. The case of the flooded regime is actually a limit of the pill-box regime in the ultra-low separation and/or high lubricant thickness ranges. Although often overlooked, this particular regime may take place when the extent of elastic deformation is so large that head-disc separation becomes comparable to the lubricant thickness. When such a phenomenon takes place, the stiction force is entirely governed by the slider area of contact, and it can be as high as 1.25N. However, when the whole slider is immersed in liquid (FIG. 1D), the resulting increase in meniscus radius will lead to a dramatic decrease in adhesion/stiction forces. Such head-disc interface scheme has been used to decrease head-disc separation for increasing storage capacity.

Figure 3:
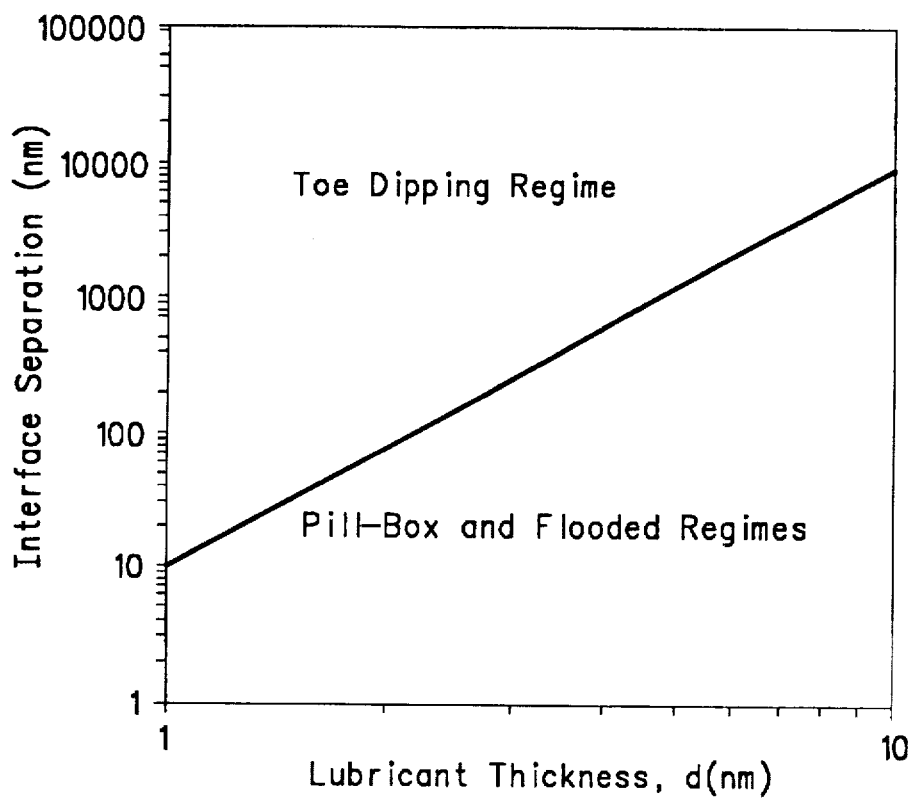
FIG. 3 illustrates the boundary between the toe dipping and pillbox regimes.

According to Eq (6), and as discussed earlier, the boundary between the toe-dipping and pillbox regimes can be numerically defined in the interface separation h/lubricant thickness d space, as reproduced in FIG. 3. In today's disc drives, head flying heights are below ca. 50 nm, and roughness peak-to-valley is in the 10 to 30 nm range. It is, therefore, immediately apparent that the toe-dipping regime can only be achieved for lubricant thicknesses well below 2 nm. This is less than typical values in the 2–3 nm range widely used in the industry. As a result, it is fair to say that, except in a few isolated cases, most of today's head-disc interfaces lie in the pillbox regime. Therefore, in the following discussion, the scope will be limited to this particular regime with no interference.

Stiction versus Asperity Height

Figure 4:
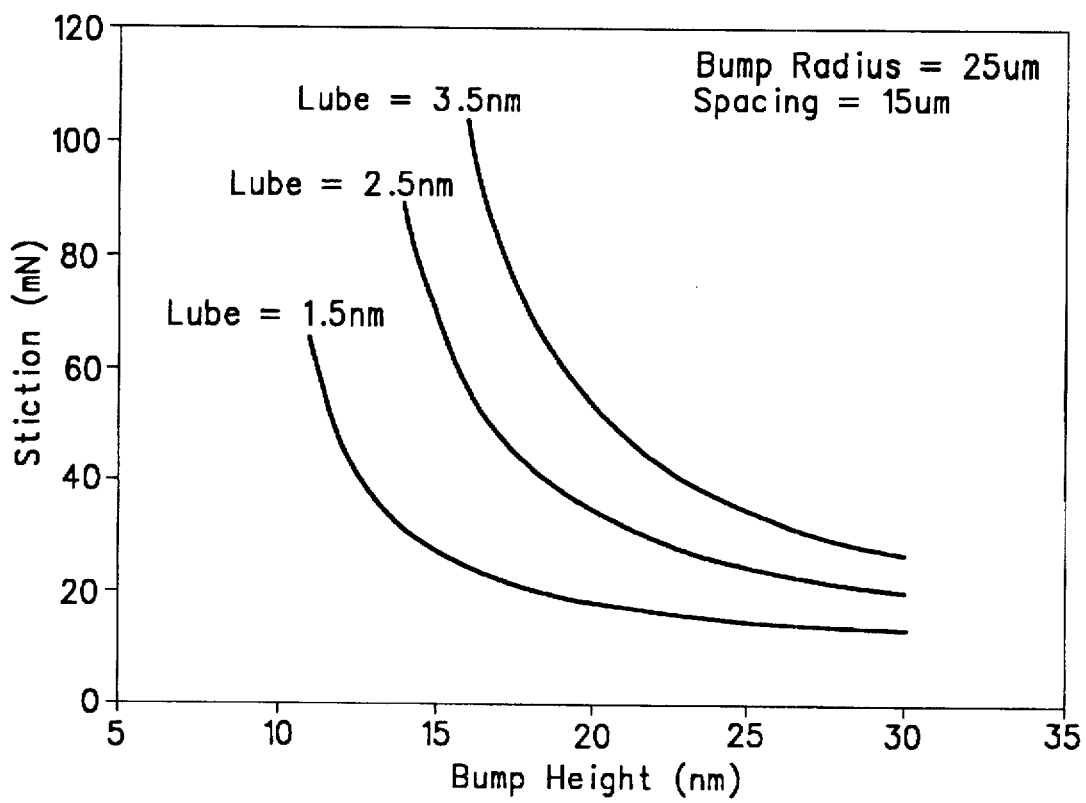
FIG. 4 illustrates the relationship between stiction and bump height for a typical lubrication thicknesses.
Figure 5:
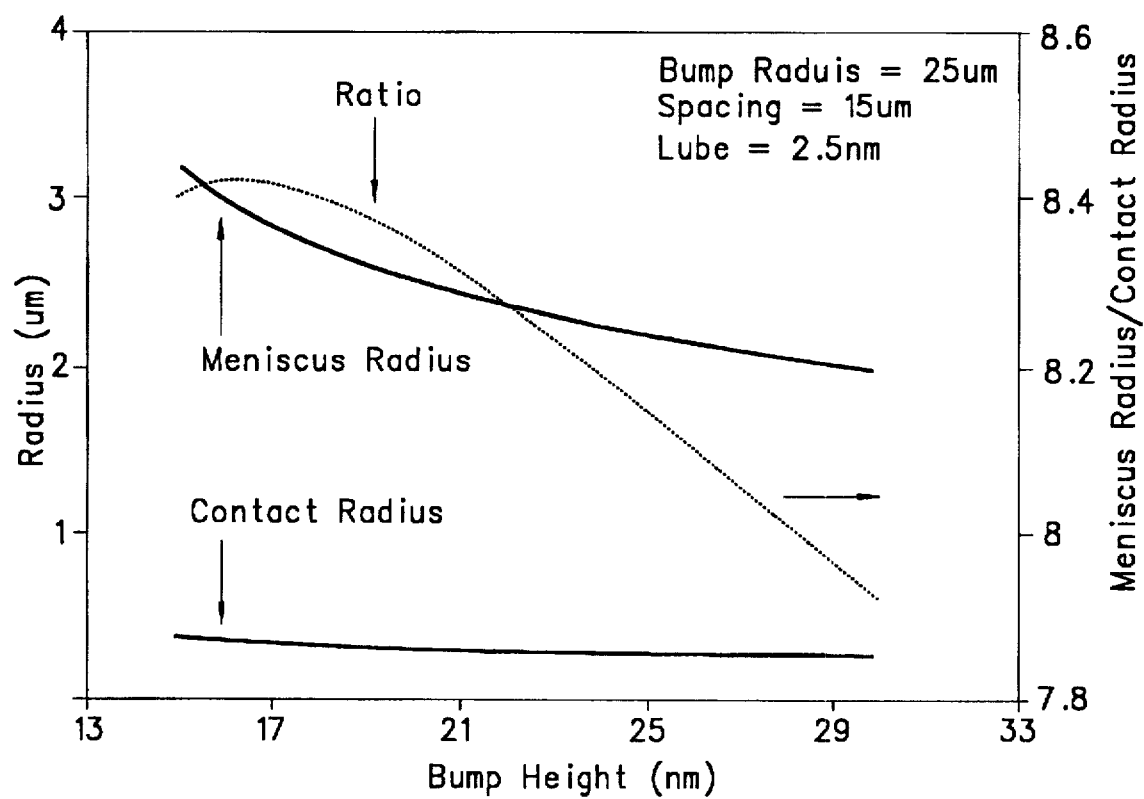
FIG. 5 plots both the contact radius and the meniscus radius at a single pump as well as the ratio between these two radii against bump height.
Figure 6A:
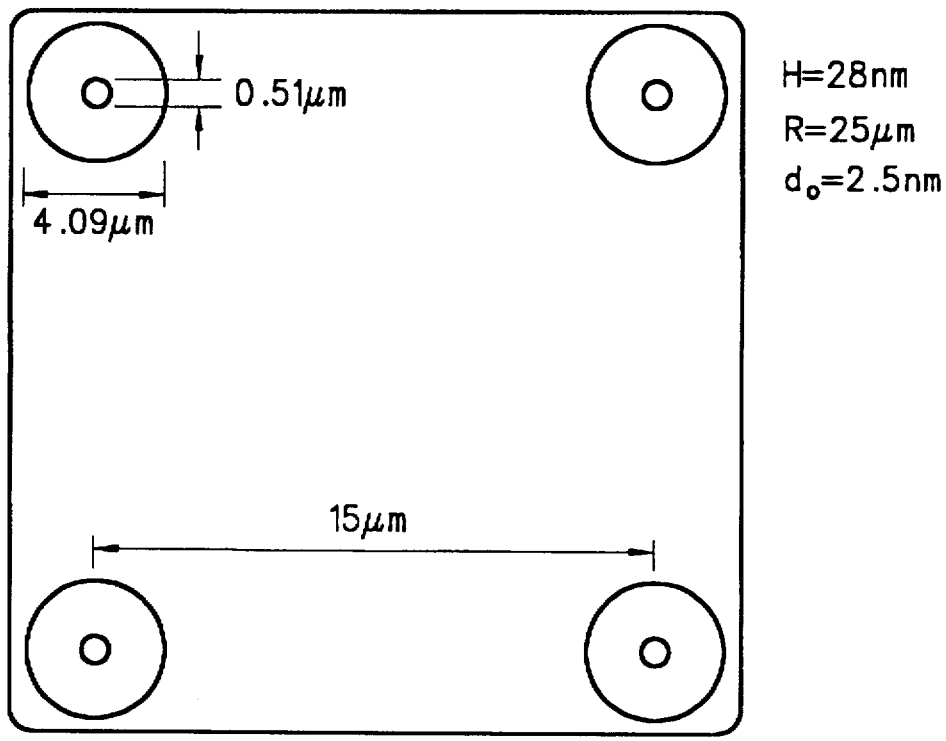
FIGS. 6A and 6B are top and side views respectively of an interface.
Figure 6B:
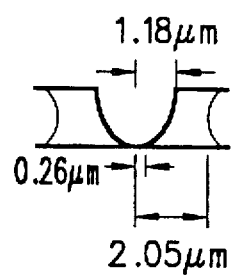

FIG. 4 shows the relationships between stiction and the texture bump height at various lube thicknesses. The texture is assumed to consist of spherical bump arrays. As expected, stiction increases as the bump height decreases. The functional relationship between stiction and the bump height is a non-linear one. Stiction increases only mildly with decreasing bump height when the bump height is relatively large, but rises sharply as the bump height becomes very low. The onset of this sharp rise depends on lube thickness. The thicker the lube, the earlier the onset. As bump height decreases, not only can each meniscus grow bigger, the capillary pressure within each meniscus also becomes high; both of these changes lead to higher stiction. It is worth noting that for a regular texture the real area of contact does not change in any significant way as the bump height decreases. In FIG. 5, both the contact radius and the meniscus radius at a single bump, as well as the ratio between these two radii, are plotted against the bump height. From these curves is should immediately become obvious that the meniscus area plays a much more important role in determining stiction than does the actual contacting area. The meniscus area can be one or two orders of magnitude larger than the contacting area, and it changes with the asperity height in a much more sensitive way than the contacting area does. For a better visualization, a top view, as well as a side view, of an interface is schematically plotted in FIGS. 6A and 6B. This interface consists of regular bumps of 25 μm in radius, 28 nm in height, and 15 μm bump-to-bump separation, as well as an original lubricant film thickness of 2.5 nm. The top view, FIG. 6A, is drawn to proportion. The gray circles are menisci. The black dots in the centers of gray circles represent the asperity contacting areas. Obviously, the side view, FIG. 6B, is not drawn to proportion, with the vertical scale being magnified to allow a clear view.

Figure 7:
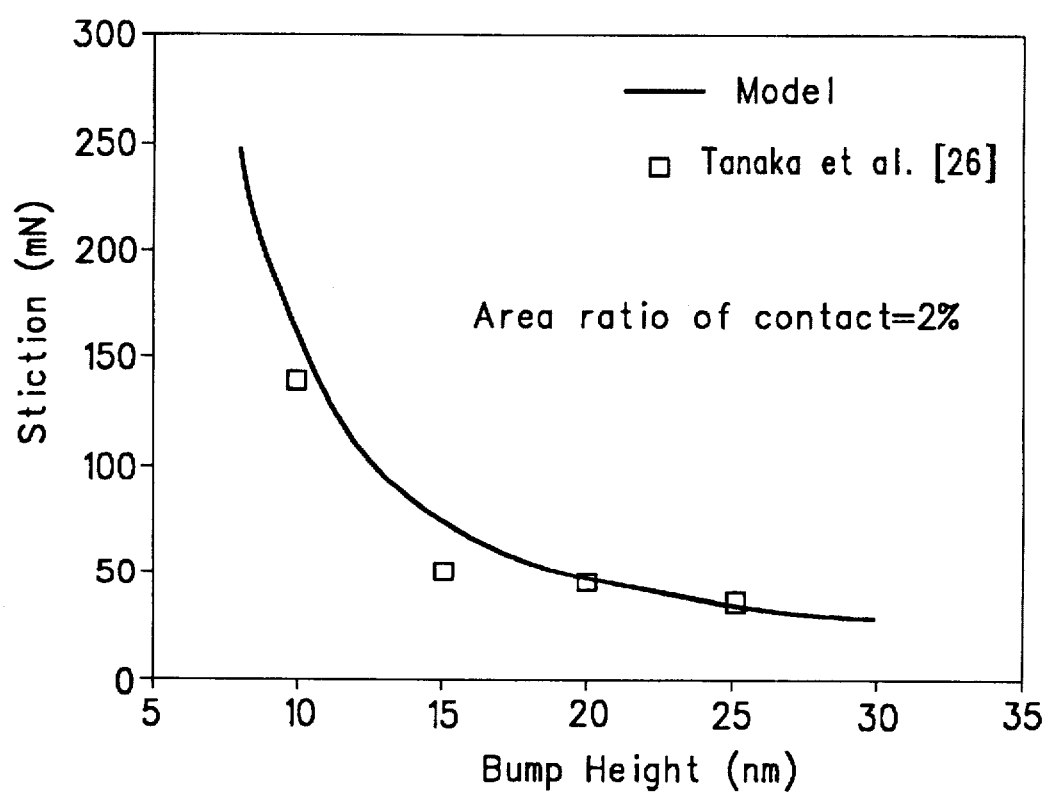
FIG. 7 shows the relationship between stiction and bump height for a typical disc.

Tanaka et al. have reported experimental studies on regular dot array square-shaped bump texture. It is convenient to compare the results calculated based on this model with their experimental results since most of the geometrical parameters needed for the calculation are available from their paper. FIG. 7 shows the relationship between stiction and the bump height of discs with 2% of the area ratio of contact ($\beta=b^2/B^2$). The good agreement between values predicted by this model and Tanaka's experimental results is achieved by assuming an effective slider area equal to 50% of the apparent area A (see above discussion).

Stiction versus Asperity Density

Figure 8:
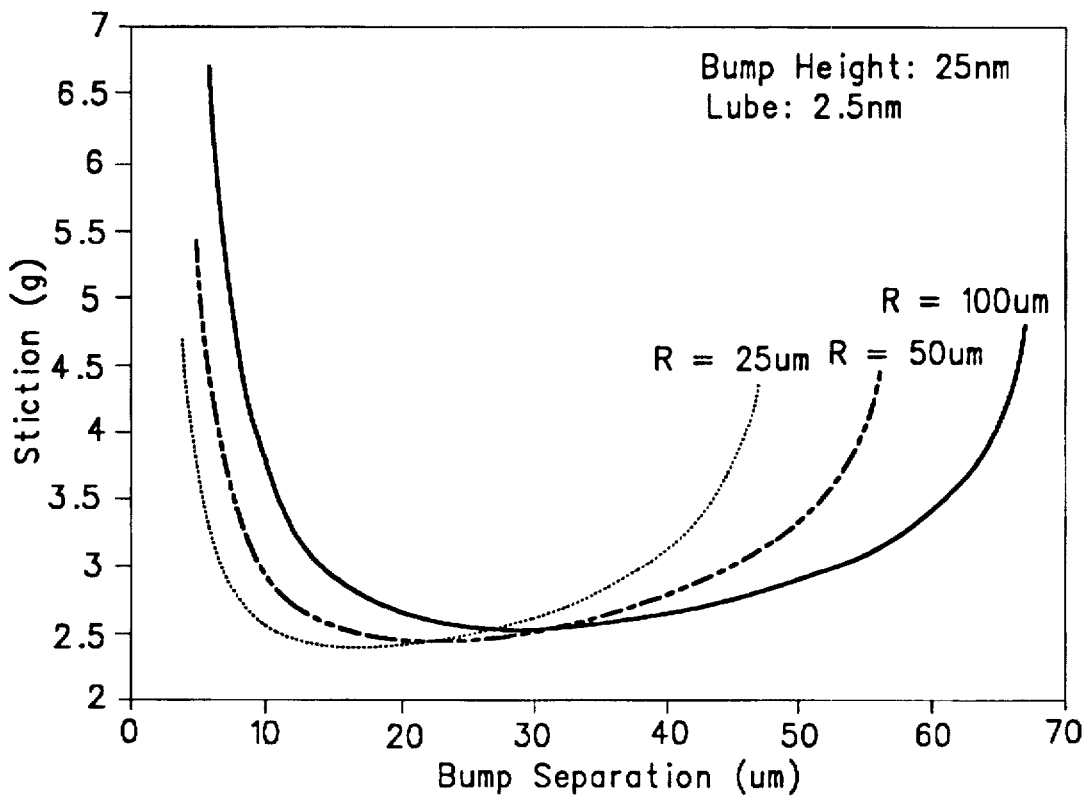
FIG. 8 is an analysis of the relationship between bump separation and stiction.
Figure 9:
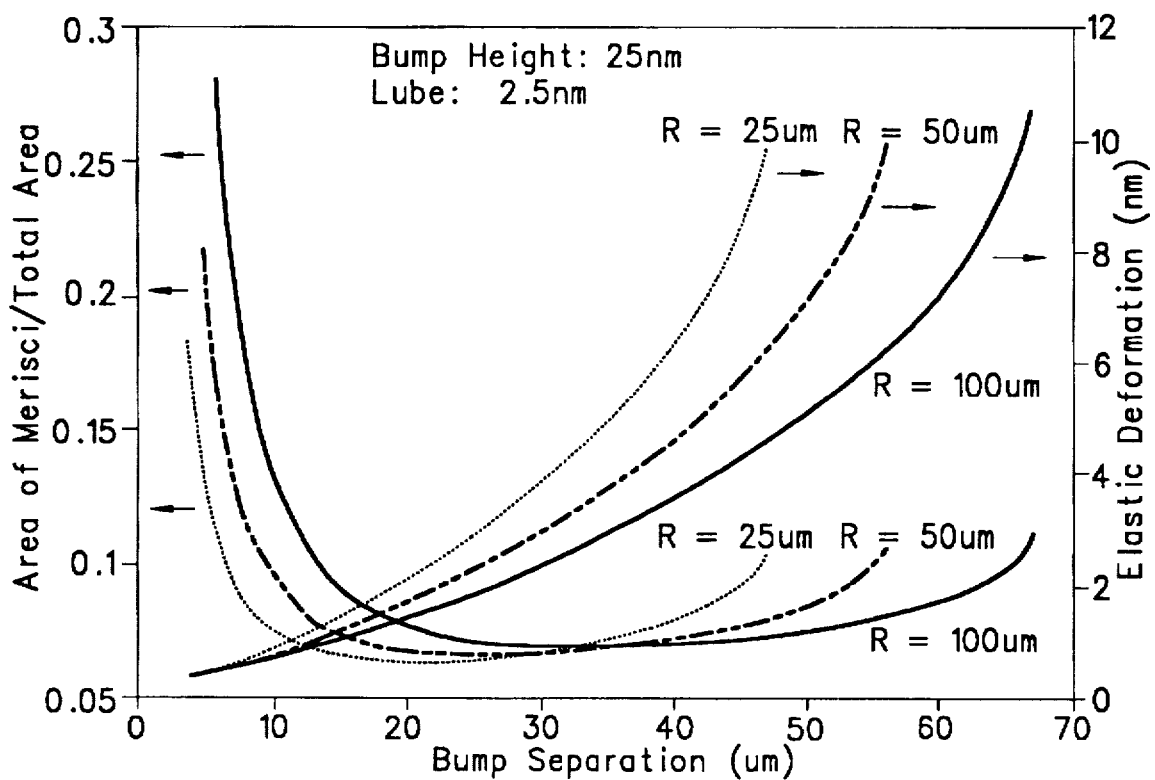
FIG. 9 shows the dependence of the meniscus area as well as elastic penetration on asperity density.
Figure 10:
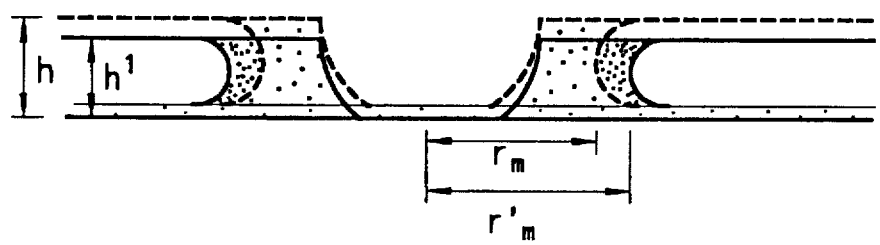
FIG. 10 is an illustration of the deformation induced growth of individual menisci.

The asperity density relates directly to the bearing ratio, which describes the real area of contact between two solid surfaces. Holding the radius of the asperity the same, the higher the asperity density, the higher the bearing ratio. Intuitively, one could guess that stiction decreases as asperity density decreases, or as the distance between asperities increases, because low asperity density means fewer contacting points. According to this model, however, this intuition is true only when asperity density is relatively high. As shown in FIG. 8, stiction may decrease, or be relatively independent of, or even increase with decreasing asperity density, depending on whether the density is high, medium or low. From this model, it is easy to understand this kind of behavior. Stiction depends on the total meniscus area, and the head-disc separation. Larger meniscus area and smaller head-disc separation both result in higher stiction. For a fixed asperity height, the head-disc separation is determined by the extent of elastic penetration. When asperity density is high, elastic penetration is small, stiction is dominated by the contacting area, and hence, stiction will decrease as the asperity density decreases. On the other hand, when asperity density is low, elastic penetration dominates stiction. Lower asperity density means less support, thus larger penetrating, leading to smaller head-disc separation, and higher stiction. Between the two extremes, there is a region where both effects are important and they tend to cancel each other. Within this intermediate region, stiction is relatively independent of the asperity density. FIG. 9 shows the dependence of the meniscus area, as well as the elastic penetration, on asperity density. One may notice that at very low asperity density, the meniscus area starts to increase as the density decreases. This increase is caused by the deformation-induced growth of individual menisci, as shown in FIG. 10. When such growth outweighs the reduction of total number of menisci, the total meniscus area starts to increase and the asperity density decreases.

Ishihara et al. recently reported their contact start/stop (CSS) lifetime results on media with well-defined pattern texture. They have observed stiction failures at zero cycle for media with either very low bump density or very high bump density. Although their results cannot be used quantitatively for a direct comparison, the overall trend qualitatively agrees with this method prediction.

The width of the flat region, or stiction window where the stiction is low and relatively independent of the asperity density, depends on the size of individual asperities, as shown in FIG. 8. Larger asperities tends to have a wider stiction window because they are more resistant to elastic penetration. From a head-disc interface design point of view, a wide section window is very desirable because it means higher tolerance to texture variation. A trade-off for using broader bumps is that the minimum stiction is higher. Nevertheless, such increase in the minimum stiction is not very significant as long as the asperity radius is not very large.

Stiction versus Asperity Radius

Figure 11:
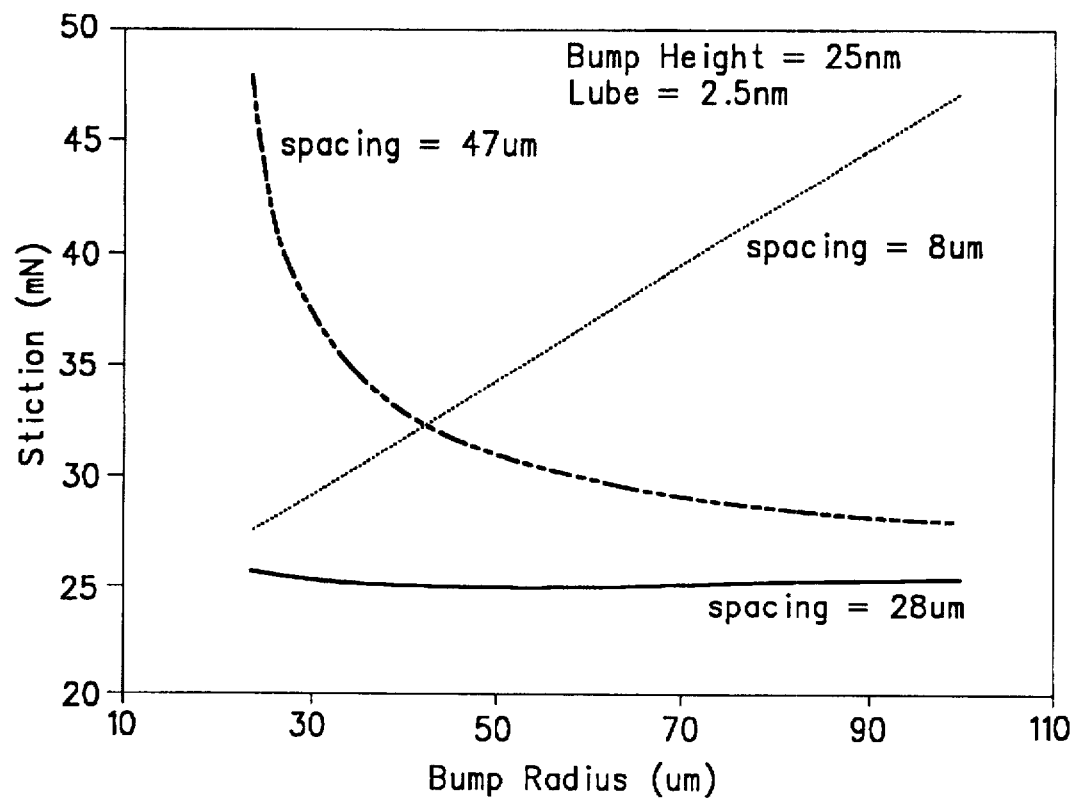
FIG. 11 shows that asperity density and asperity radius are related in their effect on stiction.

In the discussion in the previous section, it is stressed that the effects of asperity density and asperity radius are intimately related. FIG. 11 further demonstrates such interrelationship. Depending on the spacing between asperities, stiction can exhibit completely different dependence on the asperity radius. If the spacing between bumps is small, stiction increases linearly with increasing asperity radius, whereas if the spacing is large, stiction decreases with increasing asperity radius, in a rather non-linear fashion. However, if the spacing is within some intermediate region, stiction is low and almost independent of asperity radius. The reason for such complicated relationships is exactly the same as discussed in the last section, namely, the competition between the meniscus area and the elastic penetration. This result provides a useful texture design guideline, i.e., if the spacing between bumps is properly selected and controlled, one could have a texture which is basically insensitive to bump radius variation.

For square-shaped bumps, Eq (38) predicts that stiction is independent of the bump size as long as the bump height and apparent bearing ratio β remains the same. This result is in good agreement with Tanaka et al.'s experimental observation.

Random Texture

The above discussion about the relationships between stiction and texture parameters was based on the equations derived for a regular texture. From this model, it can be shown that the trends are fundamentally the same for a random texture, too. However, for a random texture, in addition to those texture parameters discussed in the last three sections, stiction can also depend very critically on the standard deviation of asperity height distribution.

Figure 12:
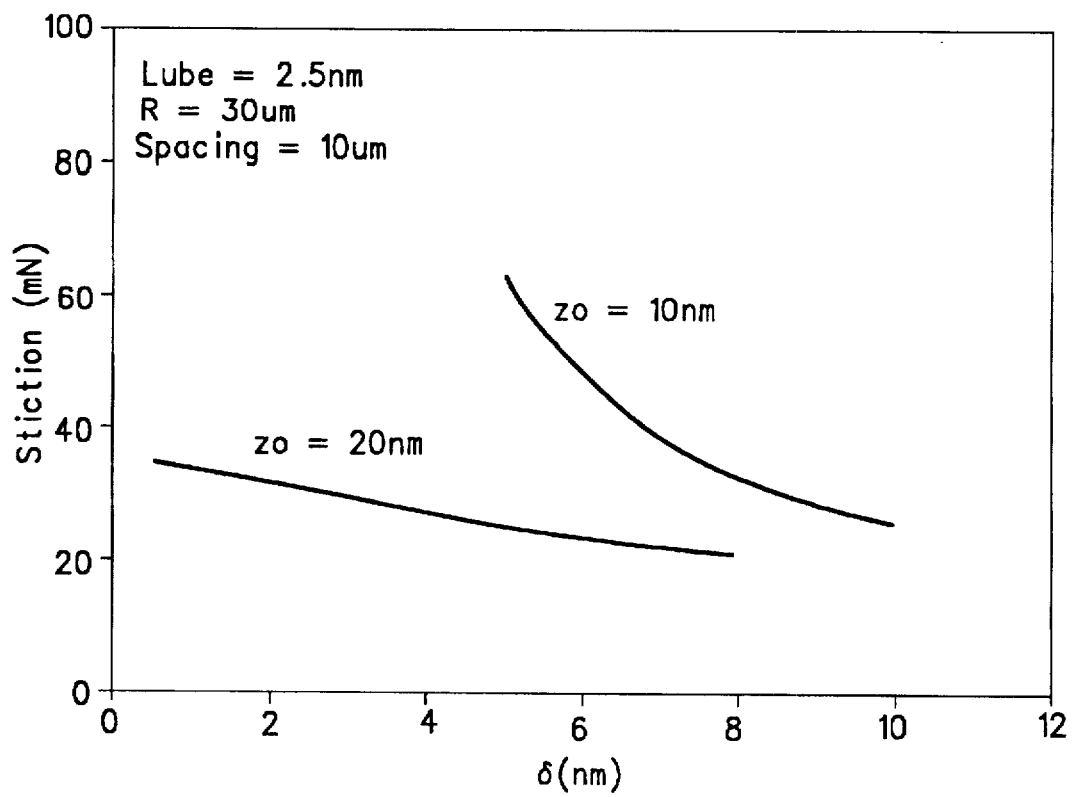
FIG. 12 shows the relationship between average asperity height and stiction.
Figure 13:
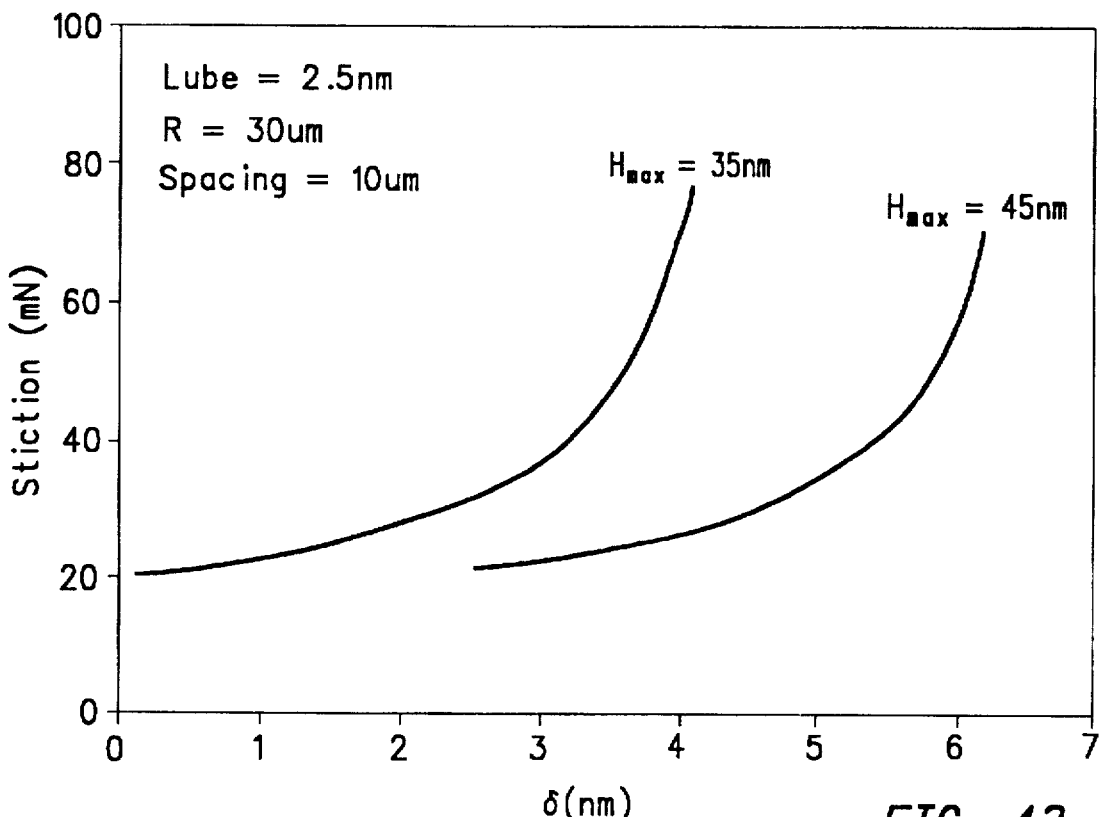
FIG. 13 illustrate that stiction increases as the standard deviation of asperity height increases.

Based on true surface of contact calculation, one expects that stiction decreases as the standard deviation increases; however, this is true only under certain conditions. For example, as shown in FIG. 12, if the average asperity height, i.e., $Z_o$ in Eq (9), is kept constant, stiction will decrease with increasing standard deviation. Because, for a fixed average asperity height, the texture with larger standard deviation is able to maintain a larger separation between the head and the media than can the texture with a smaller standard deviation. the larger standard deviation leads to lower stiction. However, trying to make a rule out of this special case by generalizing the connection between low stiction and high standard deviation can be misleading, especially for a head-disc interface. For a head-disc interface, the maximum allowable asperity height is dictated by the glide requirement, which demands that any protrusion on a disc surface is not to be higher than a predetermined value. Therefore, one does not have the freedom to have asperities of arbitrary height on the surface. In fact, according to Marchon et al.'s recent study on the relationship between the asperity distribution and the glide avalanche point, the maximum asperity height, $H_{max}$, can be approximated to the average asperity height plus roughly 6 times the standard deviation of the asperity height distribution. When the maximum allowable asperity height is fixed, the increase of standard deviation has to come at a price of lowering the average asperity height. Therefore, the relationship between standard deviation and stiction based on a fixed average asperity height is no longer applicable. As a matter of fact, in this case, stiction increases as standard deviation increases, as shown in FIG. 13. This is because a higher standard deviation in this case means lower average asperity height, $z_o$, fewer contact points, and hence larger elastic deformation, leading to smaller separation between the head and the disc, and thus higher stiction. The results in FIG. 13 implies that, in order to minimize stiction while maintaining a good glide capability for a head-disc interface, one should make an effort to reduce the standard deviation while maintaining the proper asperity height. As a result, a regular texture, which has a near-zero standard deviation in asperity height, should always be superior in terms of stiction and glide capability to a random texture, which has a finite standard deviation. Since the contacting stress at each contacting point is lower for a regular texture than it is for a random texture, the regular texture should also have better performance in wear, as well.

Influence of Lubricant and Overcoat on Stiction
Stiction versus Lube Thickness

Figure 14:
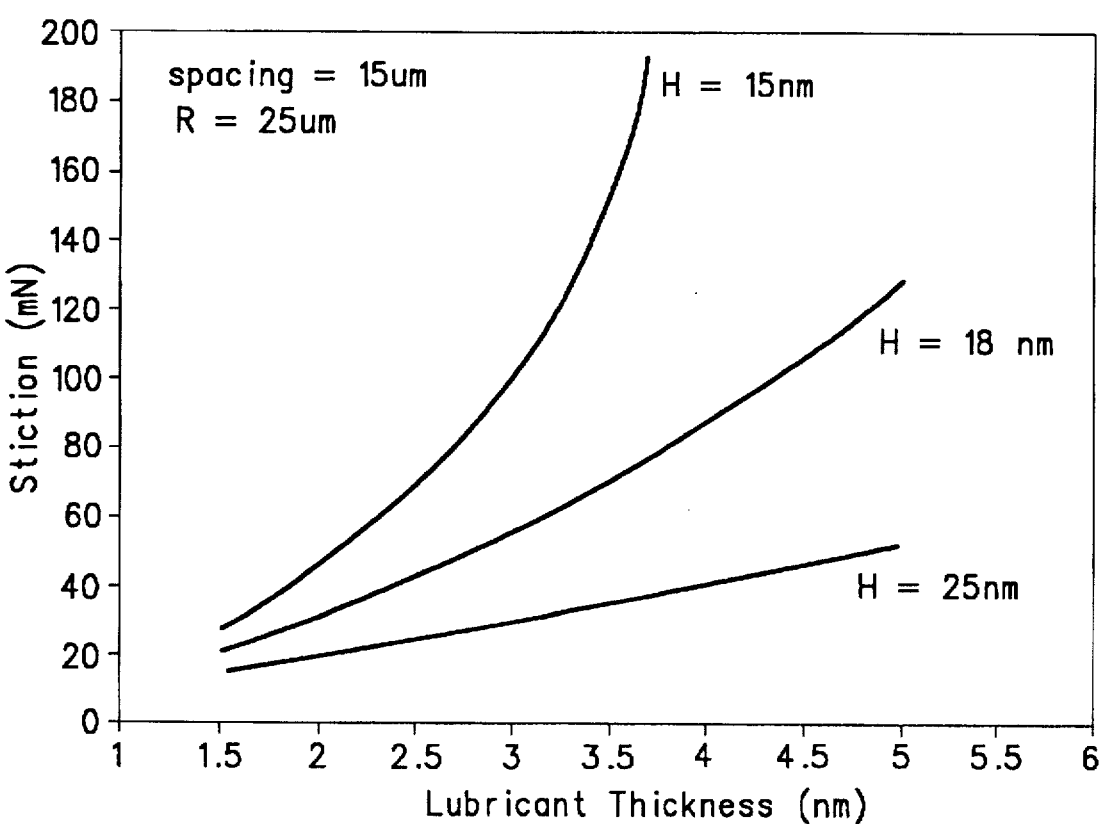
FIG. 14 shows the relationship between lubricant thickness and stiction, and as a guideline for determining tribalogical parameters for a head media interface under certain guide requirements.

Within the "pillbox" regime, stiction always increases with like thickness. The sensitivity of such dependence varies dramatically with surface morphology. FIG. 14 shows the relationships between stiction and lube thickness for different asperity height. The "stiction wall", which is defined by a sharp rise in stiction, occurs at lower lube thickness for lower asperities. This phenomenon is commonly observed at the head-disc interface. The occurrence of this "stiction wall" represents a fundamental challenge in the tribology of the head disc interface, as the roughness of the interface continues to decrease. On one hand, to prevent wear, the amount of lubricant has to be higher than a certain critical value so that a sufficient lube supply can be maintained for replenishment wherever the lubricant is removed during sliding contact. On the other hand, the amount of lubricant applied has to be lower than a certain critical value to prevent overwhelming stiction. The curves in FIG. 14, which are based on the assumption of a regular texture of spherical bumps, can serve as a useful guideline in determining tribological parameters for a head-media interface under a certain glide requirement. From these curves, it is conceivable to have a disc that glides at 15 nm without encountering serious reliability problems. Yet, these curves are affected by other factors such as the shape and size of the asperity, the density of the asperity, and the physical and the chemical properties of lubricant.

Figure 15:
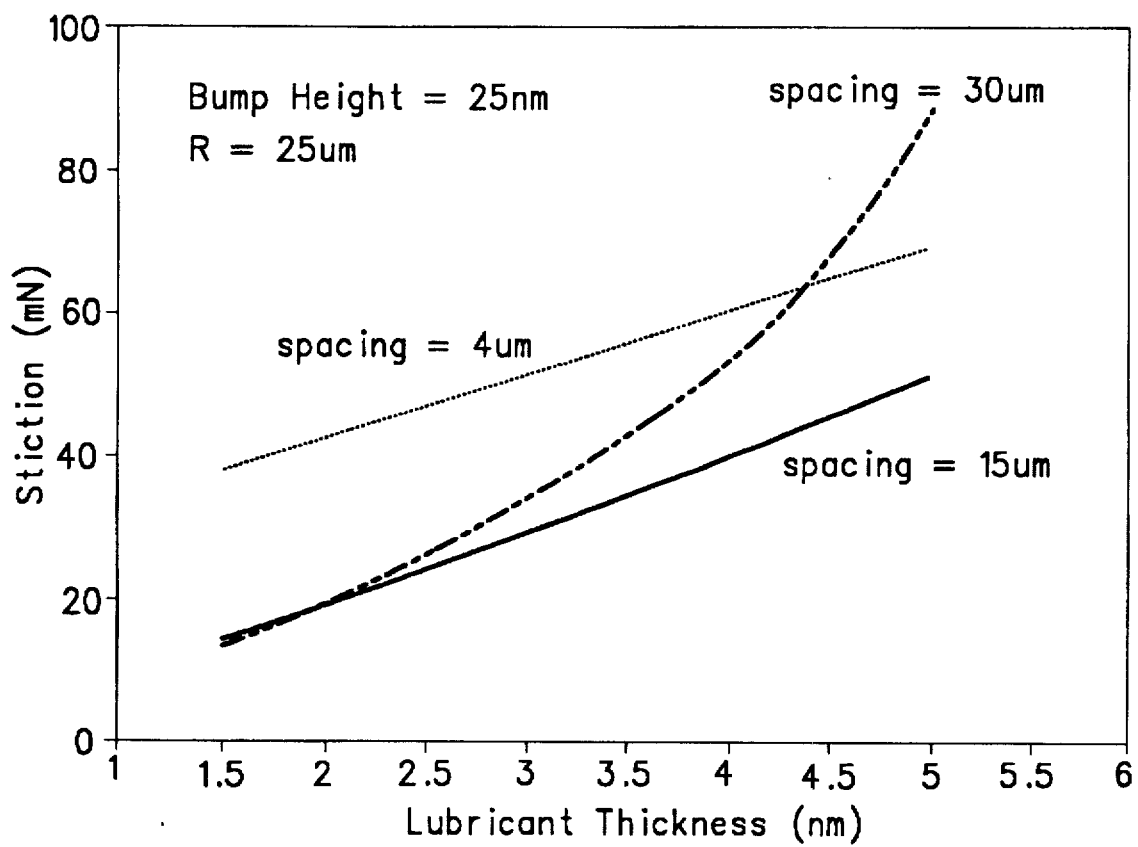
FIG. 15 illustrates the dependency of stiction on lube thickness as affected by asperity density.
Figure 16A:
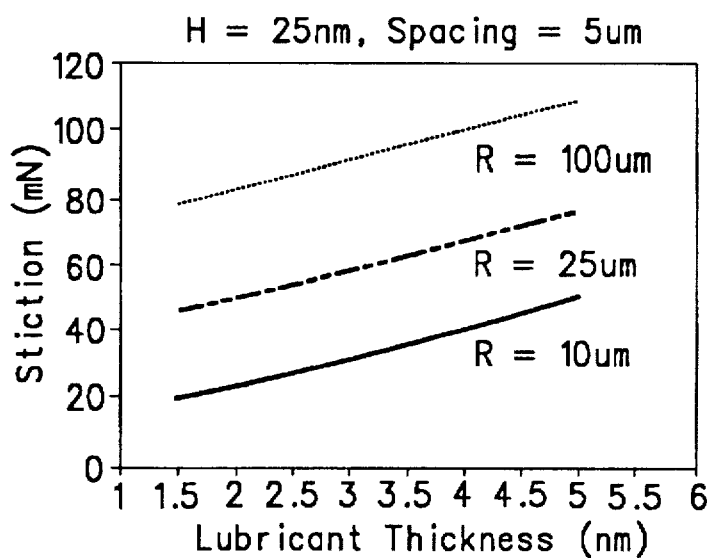
FIGS. 16A through 16C illustrate the role that asperity radius plays in altering the relationship between stiction and lube thickness.
Figure 16B:
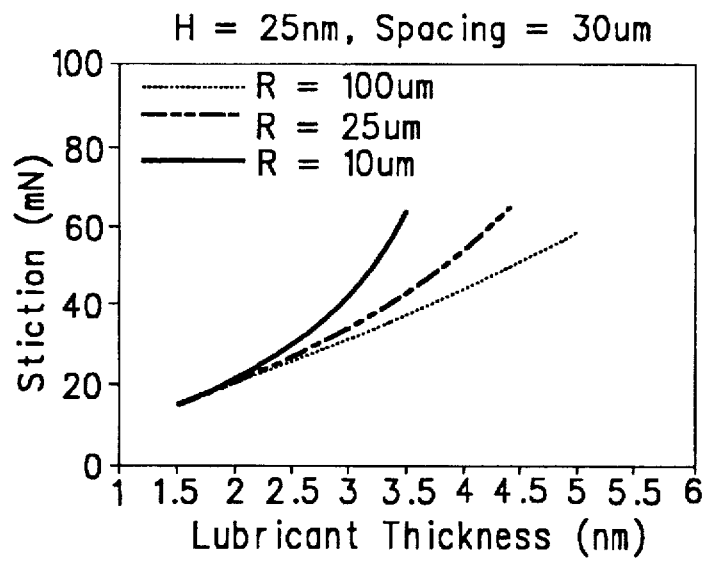
Figure 16C:
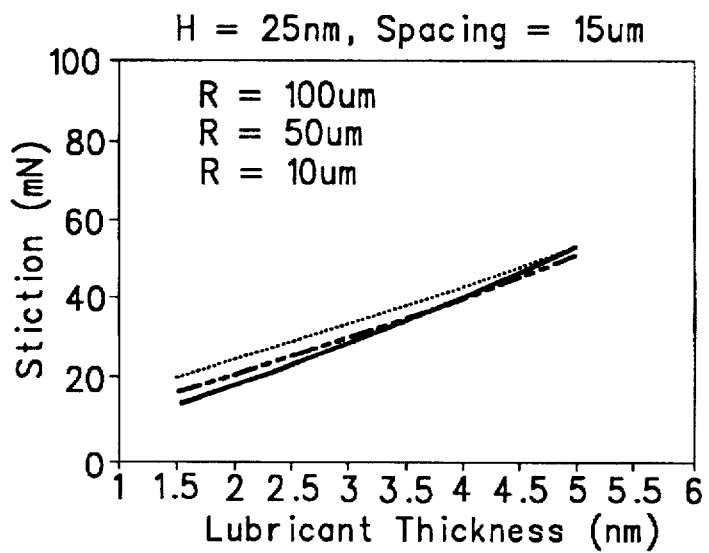

The dependence of stiction on lube thickness is affected by the asperity density, as shown in FIG. 15. For a texture of high asperity density, stiction is generally high, and increases linearly with lube thickness. For a texture of low asperity density, stiction is low at low lube thickness, but increases more rapidly with lube thickness, exhibiting a clear "stiction wall". For a texture with an intermediate asperity density, stiction is low and increases linearly with lube thickness. The role the asperity radius plays in altering the relationship between stiction and lube thickness is rather complicated. This complexity is illustrated in FIGS. 16A, B, and C. At high asperity density (16A), the asperity radius does not change the rate of stiction increase with lube thickness, but changes the absolute stiction value at any fixed lube thickness by shifting the whole curve upward or downward. The larger the asperity radius, the higher the stiction. At low asperity density (16B), the opposite is true. The asperity radius changes the rate of stiction increase with lube thickness. The smaller the asperity radius is, the faster the stiction increases. At some intermediate asperity density (16C), the relationship between stiction and lube thickness is essentially not affected by the asperity radius.

In the above discussions, the importance of asperity density has been discussed repeatedly. Stiction could be high if the asperity density is either too high or too low. At the optimum density, however, not only is stiction low, but also is the tolerance for variations in asperity radius and lubricant thickness high. Better yet, varying the asperity density does not impact the intrinsic glide capability which is dictated by the asperity height. In addition, in the case of a regular texture, the spacing is generally easier to control than the bump radius.

Figure 17:
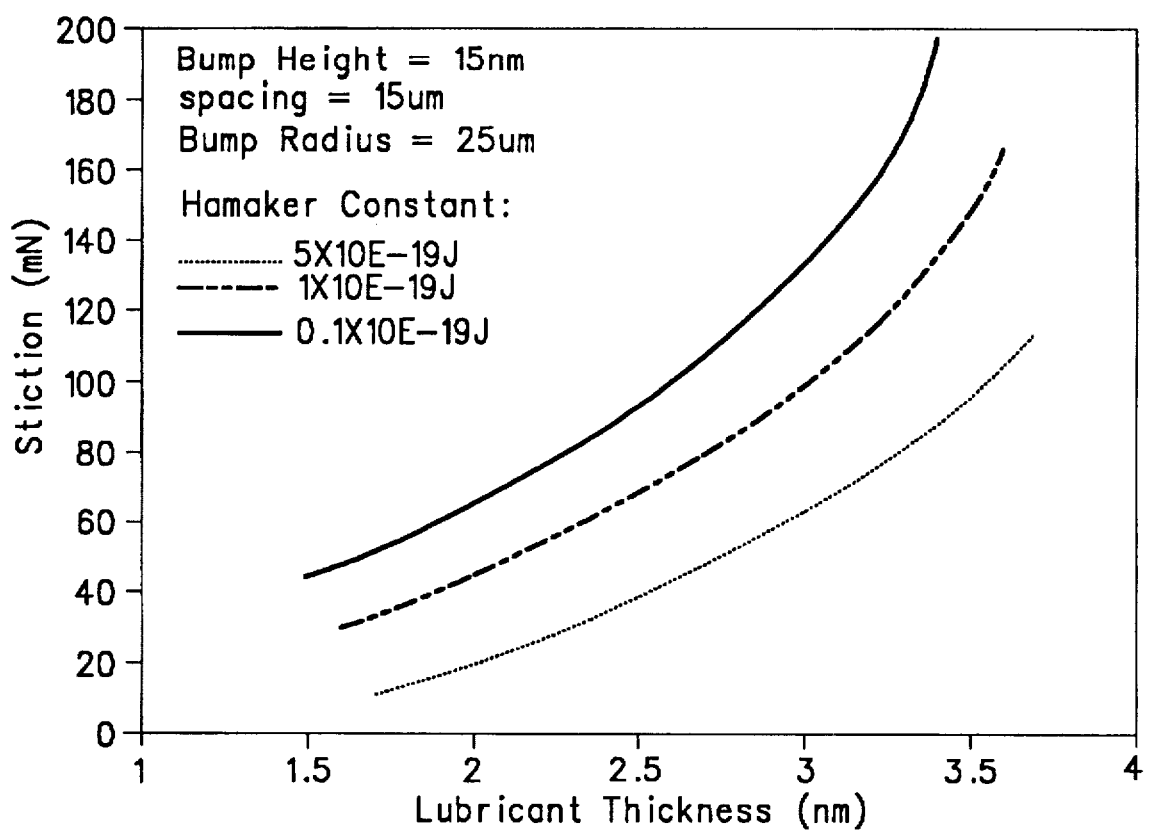
FIG. 17 shows the effect of the Hamaker constant on stiction.

The physical and chemical properties of a lubricant play an important role in determining stiction. In this model, physical properties of a lubricant such as the Hamaker constant and surface tension are directly involved in the stiction equations. FIG. 17 shows the effect of the Hamaker constant on stiction. The stiction-lube thickness curve shifts down as the hamaker constant increases. The Hamaker constant is a measure of the strength of the chemical interactions between a lubricant and a solid surface. A higher Hamaker constant means stronger interaction between the surface and the lubricant film, thus higher disjoining pressure for the lubricant film. When the disjoining pressure of a lubricant film is high, it is more difficult to draw lubricant from the film. Strictly speaking, the Hamaker constant is a property of an interface, rather than that of a lubricant film alone. For a magnetic medium, this interface includes a lubricant and an overcoat. For the same lubricant, depending on the chemical nature of the overcoat, the Hamaker constant could be different. Even for the same type of overcoat, the Hamaker constant could still be different is the density of the overcoat is different because the Hamaker constant scales with the densities of both the lubricant and the solid surface. However, one should realize that stiction does not depend on the Hamaker constant very sensitively. An order of magnitude change in the Hamaker constant is needed in order to have a major impact on stiction.

Figure 18:
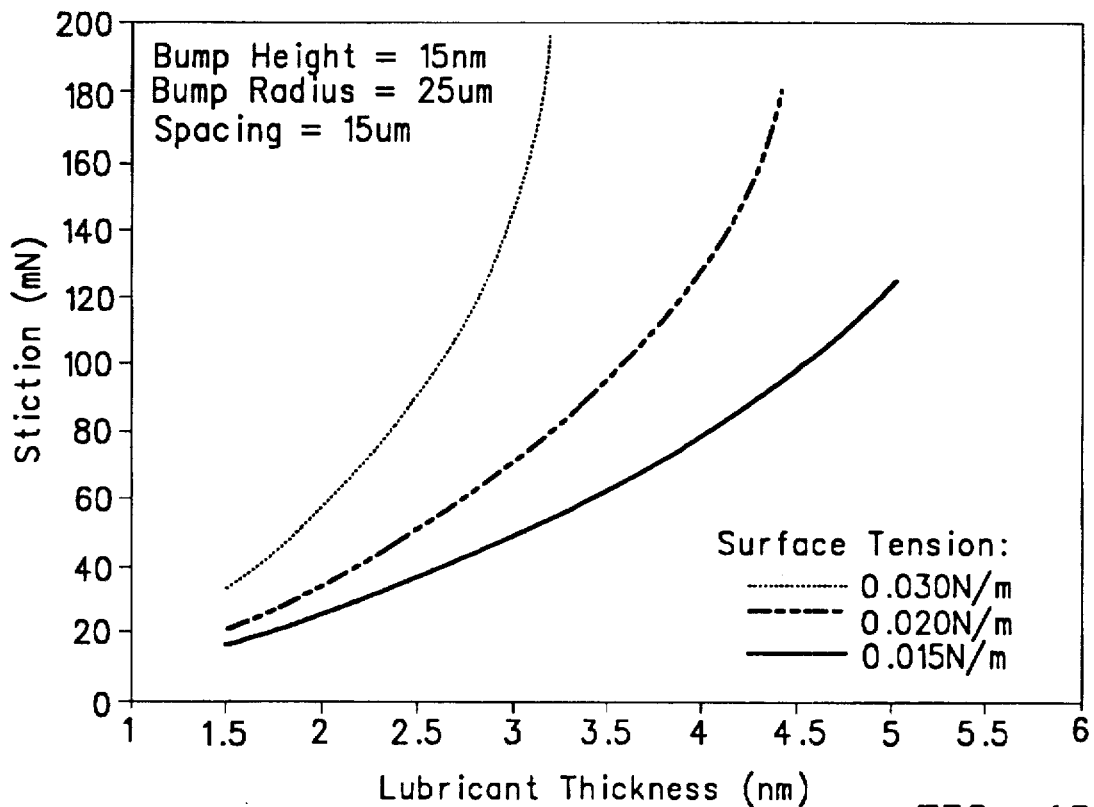
FIG. 18 illustrates the effect of surface tension of a lubricant on stiction.

In contrast with the effect of the Hamaker constant, the effect of the surface tension of a lubricant on stiction is much more pronounced. This dramatic effect can be seen clearly from FIG. 18. A significant change in stiction can be brought about with only a modest change in the surface tension. From this model, it is not difficult to understand why stiction depends on surface tension more sensitively than it depends on the Hamaker constant. In addition to having a similar influence on the extent of meniscus formation as the Hamaker constant does, the surface tension of a lubricant directly affects the capillary pressure of a meniscus. A lubricant of high surface tension not only creates bigger menisci, but also produces a higher pressure inside each meniscus, both of which lead to higher stiction. Unlike the Hamaker constant, surface tension is strictly a property of a lubricant. Therefore, regardless of the physical and chemical properties of an overcoat, a lubricant with high surface tension always produces high stiction, and vice versa.

Besides the Hamaker constant and surface tension, the physical and chemical properties of a lubricant has another important, although maybe less apparent, effect on stiction. Namely, the surface mobility of a lubricant does not appear in the equations explicitly, the effect of the surface mobility can be included through the effective apparent contact area of the slider, A. If the surface mobility is high, the lubricant can be drawn from an area that is larger than the area of a slider surface, to form menisci. In this case, the effective apparent contact area, A, should be larger than the slider surface area. Since stiction basically scales with this area, it will be higher for higher lubricant surface mobility, and vice versa. Novotny measured the surface diffusion constant on the order of $10^{-12}$ m$^2$/s for polyperfluoropropylene oxide on a smooth silicon dioxide surface. According to this value, the lubricant migrates 1 μm in 1 second, and 0.25 mm in roughly 17 hours. It is well known that the surface mobility of a lubricant can vary by many orders of magnitude depending on the physical and chemical properties of both the lubricant and the surface. Even with the same lubricant on the same surface, the surface mobility of the lubricant can still be dramatically different depending on kinetics of its interaction with the disc surface. Consequently, to be more rigorous, the effective apparent contact area should be determined from the knowledge of the surface mobility of the lubricant under specific conditions. Compared to either the Hamaker constant or the surface tension, the effect of surface mobility on stiction provides a much more practical way to control stiction. For a given choice of a lubricant and an overcoat, there is very little one can do to change either the Hamaker constat or the surface tension, but one can definitely alter the surface mobility of the lubricant through various treatments to promote interactions between the lubricant and the surface.

Stiction versus the Mechanical Property of Overcoat

Figure 19:
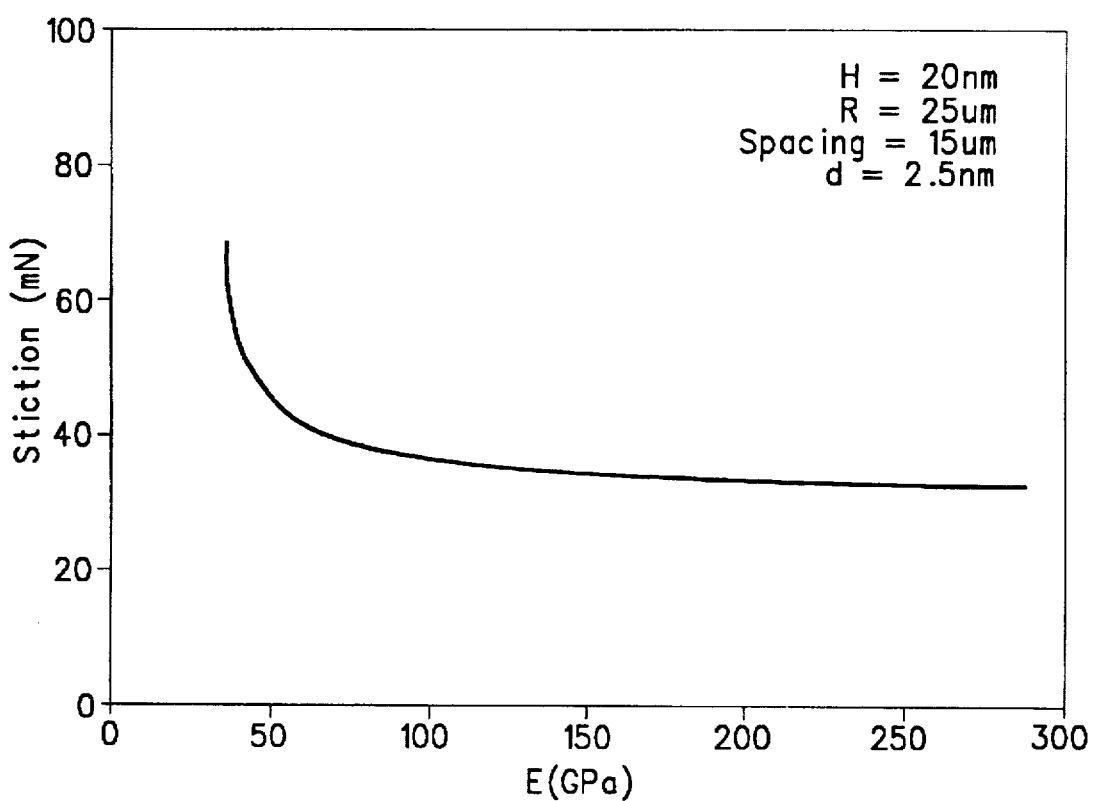
FIG. 19 shows the relationship of stiction versus the composite Young's modulus of an interface.
Figure 20:
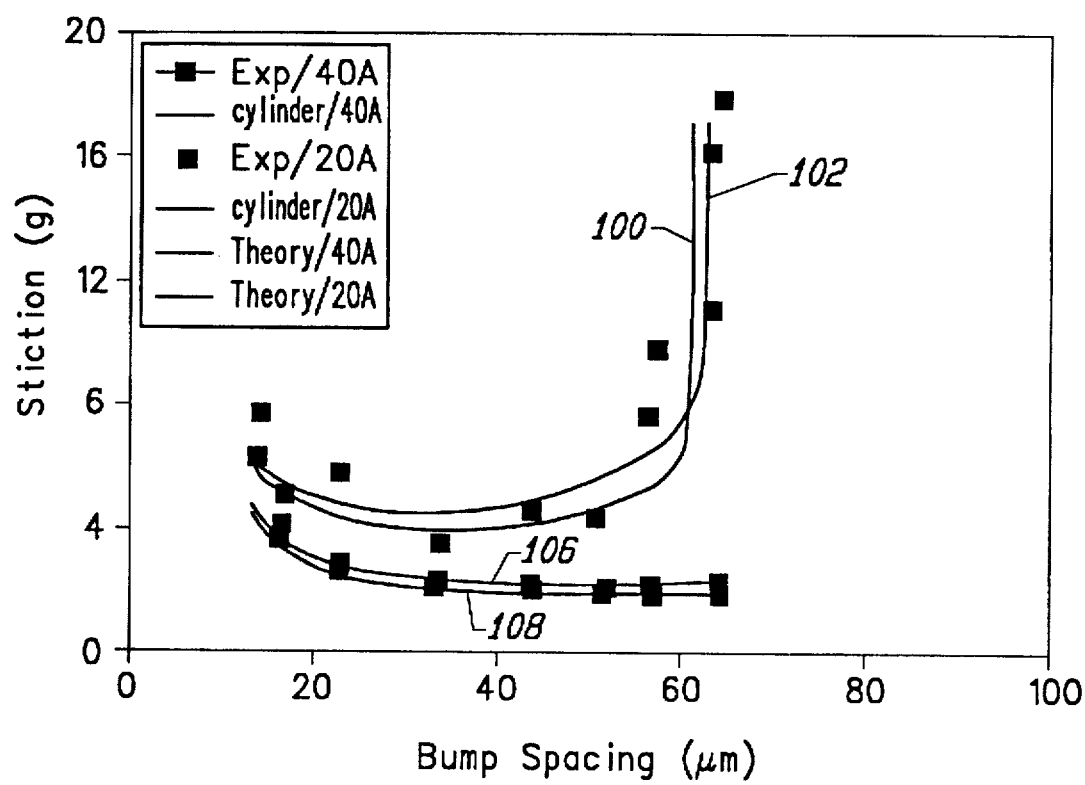
FIG. 20 illustrates the relationship between stiction and bump spacing in an actual example of a disc drive model.

Besides the chemical properties of the overcoat, discussed in the previous section, the mechanical properties of the overcoat also affect stiction directly. FIG. 19 shows stiction versus the composite Young's modulus, E, of an interface. Within a wide range, stiction only weakly depends on the elastic properties of the interface. However, stiction can rise very quickly when the Young's modulus of the interface is lower than a certain limit. From the model it is clear that stiction depends on the stiffness (or compliance) of the interface. A weak (i.e., a more compliant) interface is more likely to collapse under load, resulting in high stiction. From Eq (10), the compliance of an interface is inversely proportional to the composite Young's modulus of the interface.

Some examples of the use of the above theoretical model for the optimization of stiction levels in a given disc drive have been developed and will be described with references to FIGS. 20–24. In applying this model, certain parameters such as the glide height of the slider over the surface of the disc and the available motor torque of the spindle motor are defined by disc drive designers, either exactly or within narrow limits. Therefore, the challenge and application of the model becomes to operate within the constraints imposed. For example, since the glide height is typically predefined in order to optimize bit-to-bit spacing, then this glide height also defines the maximum height of any asperity which must be less than the glide height and leave a reasonable safety margin. The slider area and lubricant thickness may also be predefined.

Thus, to take into account the constraints imposed by the design limitations, a commercially available piece of equation solving software such as Math Cab which is available from MathSoft Corporation is programmed with the five basic equations identified in the detailed theoretical analysis above as equation (2), which establishes the normal force for the slider; equation (4), which defines the total meniscus force; equation (5), which defines the relationship between equations (2) and (4); equation (6), which defines the quasi-equilibrium state for the disjoining pressure of the film; equation (7), which describes the total volume of lubricant which is conserved during meniscus formation; and equation (8), which calculates the stiction force. The equations may be solved for the numerical value of the stiction given any other set of physical parameter including the shape and size of the bumps, the contact area of the slider, the height of the bumps, the surface tension of the assumed lubricant and the necessary constants such as the Hamaker constant and Young's modulus of the overcoat.

The shape of the bump may be preferably defined as spherical or cylindrical; in many preferred embodiments, the bump shape is ring or volcano-like shape, i.e., with the center being open or hollow. An additional constant would be the radius of curvature of the bump. The head load and slider area are typically also defined. It will be seen from the figures to follow that, primarily, the design is optimized by changing the values of the bump spacing and bump height to optimize the value of the stiction. It has been found based on the analysis above, that it is the variations in these parameter which can have a primary influence on optimization of the stiction, especially in view of the fact that as noted above, most other parameters are established by the designers of the overall disc drive rather than the fabricators of the rotating hard disc.

Referring next to the FIGS. 20–24, the results which may be produced with this analytic approach are demonstrated. For example, referring first to FIG. 20, the relationship between bump spacing and stiction is explored for two different types of bumps. That is, the higher pair of lines that is representing a greater level of stiction, and marked 100 and 102, both utilize a lubrication thickness of 40 Å. In thicker line 100, each bump is the shape of a cylinder or more particularly, a ring or volcano-like structure. The narrower line 102, uses bumps on the disc having a spherical geometry. It can be seen at the optimum point, a bump spacing of about 30 μm; and as the spacing approaches 60, the stiction increases so rapidly as to make the disc effectively non-functional. The lower pair of lines, labelled 106, 108 used a thinner lubrication layer of approximately 20 Å. For this, the bump spacing optimizes approximately 50 mm and, in fact, remains fairly constant through the range of bump spacing of interest. It is interesting to note that it has been surmised that performance in terms of reduction of stiction could be optimized for maximizing the number of bumps; that is, packing them as closely together as possible. In fact, there is a lower limit to effective bump spacing at about 30 mm for both spherical and cylindrical geometries, which is clearly demonstrated to reside at about 30 to 35 mm by this model. It is worth referring at this point back to the theoretical development found in this paper. The curve shown in FIG. 20 and the Figures to follow, are based primarily on five key equations, which are discussed above, and which are programmed into the computer to analyze the constants and variables imposed by the disc drive design. The first of these is equation (2), wherein the elastic deformation of the bump responds to applied force is analyzed. The normal load on the bump comprises the head load imposed on the bump together with the meniscus force. That is, the bump will actually deform slightly in response to a load.

The next equation to be solved is equation (4) which defines the meniscus force which is the interaction between the lubricant and the surface which takes into account the fact that as a meniscus form when the applied load brings the slider disc into contact. Menisci form at contacting points, resulting in additional loading which, in turn, brings more asperities into contact with the slider resulting in further meniscus formation and higher loading. The next equation is equation (7) which is a substitution of equations (2) and (4) in paragraph 1 and essentially takes into account that the supply of lubricant on the surface of the disc is constant as there is little or no evaporation of the lubricant.

The next equation is equation (6), which further takes into account the fact that as a meniscus forms, as described above in the discussion of equation (4), it must be formed by drawing some lubricant from the surrounding area so that eventually an equilibrium state is achieved at which the disjoining pressure of the film, which is what makes it more and more difficult for meniscus to draw lubricant from the surrounding area, equals the capillary pressure of meniscus.

The final equation, of course, is equation (8) which utilizes the other forces already calculated to calculate the stiction.

It should be further noted that relative to work done previously in the field, work is concentrated on what is shown in FIG. 1 at section A which is the "toe dipping" regime. This "toe dipping" regime did not accurately represent the actual operational state of a disc drive slider relative to a disc. The "pillbox" regime studied in this paper and shown at section B is, in fact, much more representative of actual operation of a disc drive. Section C of FIG. 1, in fact, guarantees failure of the disc drive. By "pillbox" it is meant that the individual asperities are submerged in the lubricant; however, each individual meniscus has not joined each other and is separately defined across the surface of the disc. It is also noticeable that this model assumes that the lubricant flows over the surface of the disc. This invention takes account of the fact that the lubricant when supplied to the surface of the disc will redistribute itself to satisfy the laws of physics. The previous models failed to take account of this issue, either because of a lack of recognition of the issue or the difficulty engendered by accounting for it.

Figure 21:
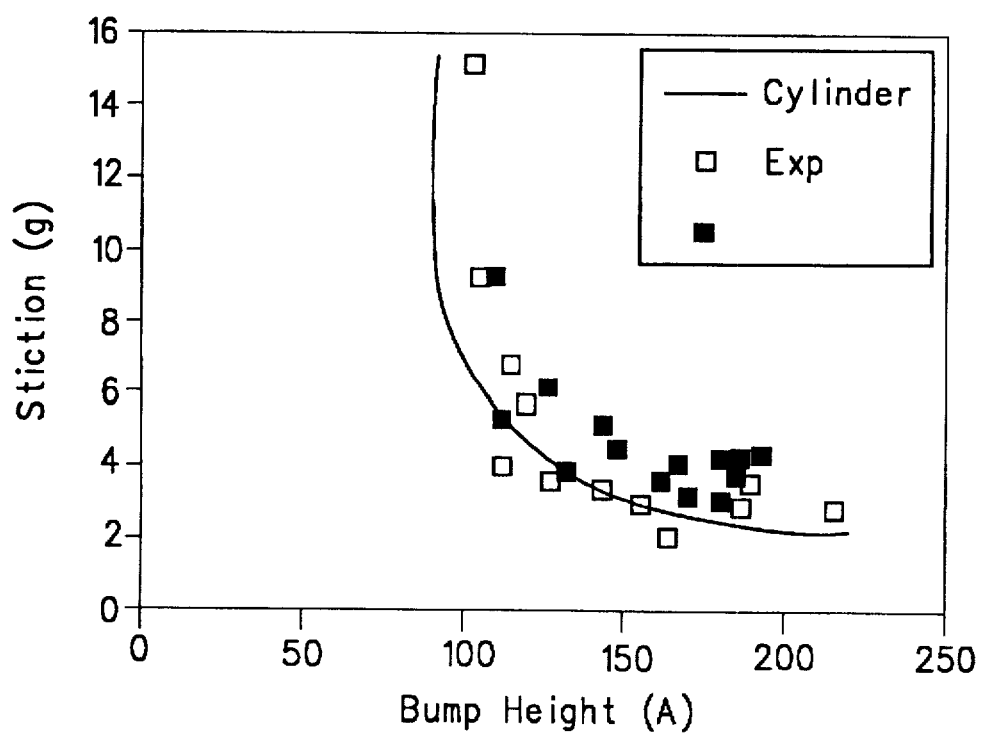
FIG. 21 illustrates the relationship between stiction and bump height in an actual disc drive model.

Turning next to FIG. 21, this is a graph of experimental data based on certain fixed parameters and measurements of stiction for different bump heights. The bump height has a very significant parameter because current trends in disc drive technology where efforts are directed to storing increased amounts of data on the same disc seek to achieve this goal by flying the transducer as closely as possible to the disc. Obviously, this limits the bump height which can be utilized to texture the surface of the disc. In FIG. 21, the bumps of the volcano shape described above, and have a diameter of 5.35 microns; the lubrication thickness is 25 angstroms; the spacing of the bumps is 35 microns; and the slider is a 50% slider. The way to use this graph would be to begin with the motor torque, which is a known value specified by the disc drive designer and is the torque available to start the disc and break the disc free from the slider resting on the disc, and which therefore is the torque available to overcome the stiction. In this example if the torque available allowed a maximum stiction of about 5 grams, then the bump height could be no less than amount 120 angstroms.

Figure 22:
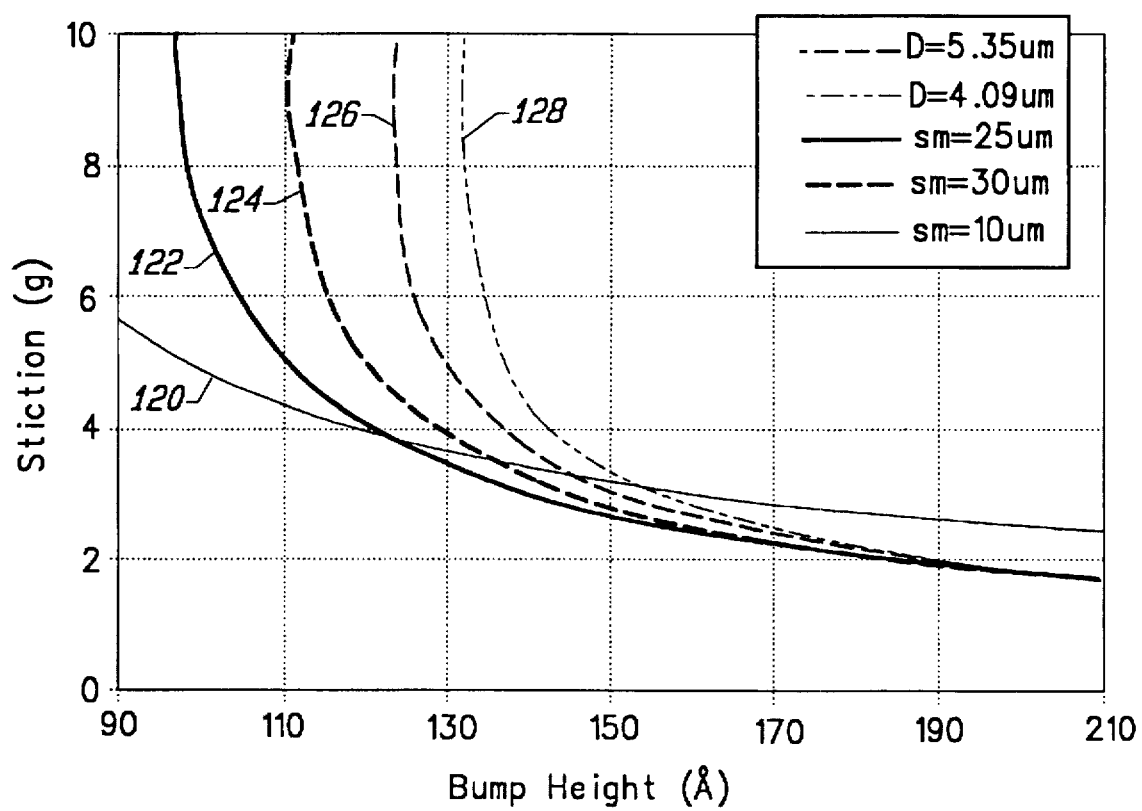
FIG. 22 is further curve illustrating the relationship between stiction and bump height with the diameter of the bump being modified and the spacing of the bumps being modified.
Figure 23:
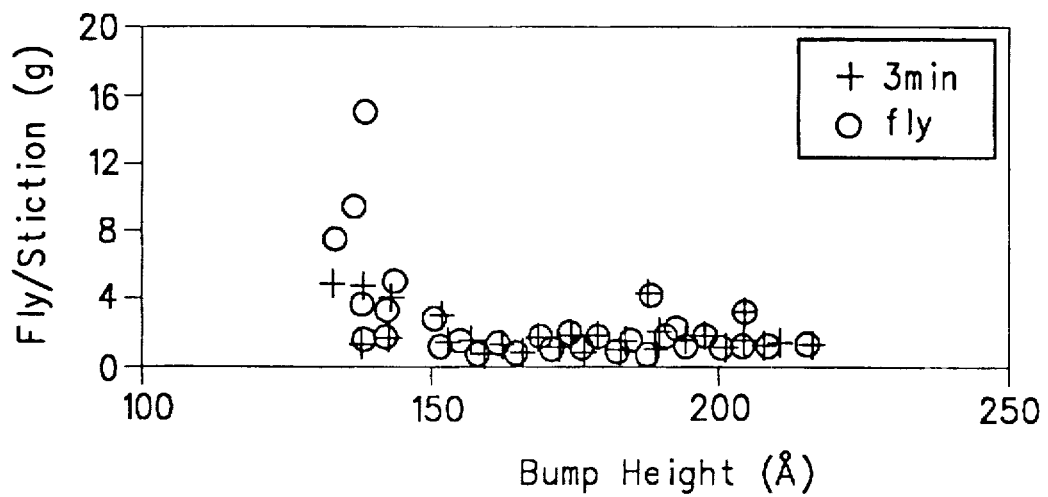
FIG. 23 and FIG. 24 are further examples of actual disc drive with the curve showing the relationship between bump height and stiction.
Figure 24:
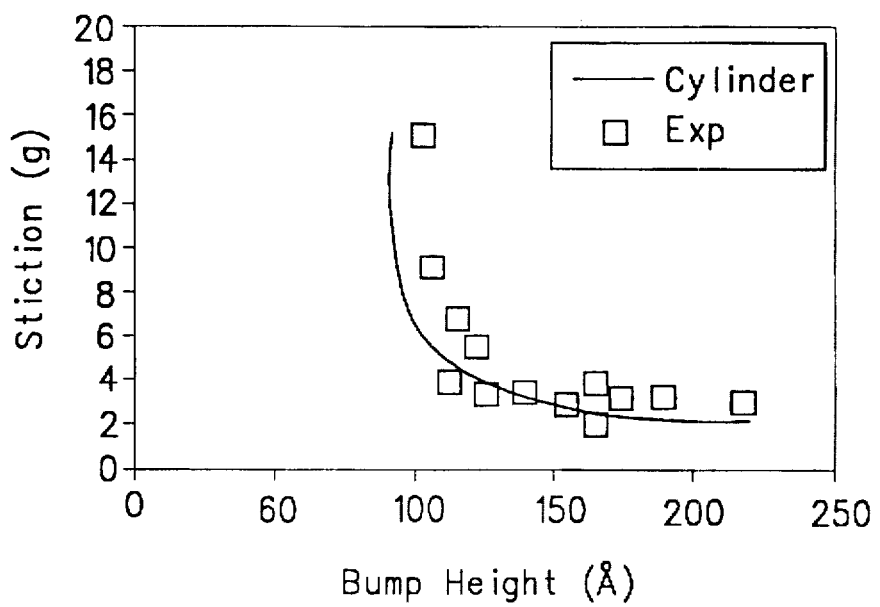

Turning next to FIG. 22, a number of curves developed using the model described above are shown herein. One of the curves, 126 is the same curve as shown on the previous page, and as indicated includes a diameter of 5.35 microns for the bump. As noted, for this curve 126, the spacing was 35 microns. The adjacent curve 128 indicates that by reducing the diameter of the bumps and maintaining the same spacing of 35 microns, that the stiction margin is reduced for bumps of the same height, therefore indicating that this is an undesirable approach.

The remaining curves 120, 122, and 124 are for different spacings, all the curves being done for an assumed diameter of 5.35 microns. Thus for example the series in curves in FIG. 22 that in selecting an optimum diameter of 5.35 microns for the bumps, that performance in terms of stiction versus bump height where there is a fixed upper limit on stiction could be improved by going to a smaller spacing SM such as shown by curve 122. However, for practical purposes it is difficult to go beyond curve 122 where the spacing is 25 microns, to the spacing of the curve 120 which is 10 microns. This would have a dramatic effect on throughput; the moving the spacing from 25 microns to 10 microns would require making two and a half times as many bumps on a disc, dramatically slowing the rate of manufacture of the discs.

Further research not shown in these Figures indicates that more advanced discs could be made with an average bump height of about 180 Angstroms; bump diameter of 5.3 microns; spacing of 25×32 microns; and a lubrication thickness of 25 Angstroms, ±5 Angstroms. Further development yields an average bump height of 160 Angstroms and lubrication thickness of 10 Angstroms ±3 Angstroms.

This fact also demonstrates one of the attractions of this mode of theoretical analysis. Since the motor torque and glide height are predefined, the model can be replicated to optimize stiction against a target level number, while continuing to take into account other factors which cannot be built into the model such as the through put and other costs of building the disc defined by any one of these curves.

What is claimed is:

1. A method of establishing an optimum stiction level on a given disc surface comprising establishing a glide height and available motor torque to a substantial approximation for a given disc drive, and thereafter establishing an optimum stiction level for the disc surface including defining a normal force on the slider; defining a total meniscus force between the disc surface and the slider; defining a quasi-equilibrium state for a disjoining pressure of the film on the surface of the disc relative to said meniscus force; describing a total volume of lubricant which is conserved during meniscus formation on the surface of the disc; and thereafter calculating the stiction force for the disc surface.

2. The method as claimed in claim 1 wherein the normal force on the slider is established according to the equation $$P = N \int_{h}^{\infty} p(z)\phi(z)dz.$$

3. The method according to claim 2 which defines the total meniscus force according to the equation $$F_m = N \int_{h-d}^{\infty} P_m A_m \phi(z)dz$$

4. A method according to claim 1, wherein said normal force on the slider is defined according to the equation $$P = N \int_{h}^{\infty} p(z)\phi(z)dz,$$

and said total meniscus force is defined according to the equation $$F_m = N \int_{h-d}^{\infty} P_m A_m \phi(z)dz$$

and furthermore by defining the quasi-equilibrium state for the disjoining pressure of the film according to the equation $$\frac{A_H}{6\pi d^3} = \frac{\gamma}{r} .$$

5. A method as claimed in claim 1 for describing the total volume of lubricant which is conserved in meniscus formation according to the equation $$Ad_0 = N \int_{h-d}^{\infty} v_m \phi(z)dz + \left[ A - N \int_{h-d}^{\infty} A_m \phi(z)dz \right] d.$$

6. A method of calculating stiction force as claimed in claim 1 wherein the stiction force is calculated by the equation $$F = \mu P = \mu(F_m + W).$$

7. A method according to claim 1 wherein:

a numerical value for said stiction is solved according to the equation $F = \mu P = \mu(F_m + W)$, where F is the stiction, $\mu$ is the coefficient of friction, P is the normal force for the slider, $F_m$ is the total meniscus force, and W is the applied load; and wherein said normal force on the slider is defined according to the equation $$P = N \int_{h}^{\infty} p(z)\phi(z)dz;$$

said total meniscus force is defined according to the equation $$F_m = N \int_{h-d}^{\infty} P_m A_m \phi(z)dz;$$

said total volume of lubricant which is conserved in meniscus formation is defined according to the equation $$Ad_0 = N \int_{h-d}^{\infty} v_m \phi(z)dz + \left[ A - N \int_{h-d}^{\infty} A_m \phi(z)dz \right] d;$$

said quasi-equilibrium state for said disjoining pressure of the film on the surface of the disc relative to said meniscus force is defined according to the equation $$\frac{A_H}{6\pi d^3} = \frac{\gamma}{r} ;$$

and at least one of the group comprising the shape and size of the bumps, the contact area of the slider, the height of the bumps, the surface tension of the lubricant, are defined.

8. A method as claimed in claim 6 wherein the shape of the bump is defined as spherical or cylindrical.

9. A method as claimed in claim 6 wherein the bump shape is ring or volcano-like with the center being open or hollow, and having a defined radius of curvature.

10. A method as claimed in claim 1 wherein the stiction level is optimized by modifying values of bump spacing and bump height.

11. A method as claimed in claim 10 wherein the lubrication thickness on the surface of the disc is between 20 and 40 angstroms.

12. A method as claimed in claim 10 wherein the bump spacing is between about 30 and about 60 micrometers, bump to bump.

13. A method as claimed in claim 12 wherein the bumps are of volcano shape and have a diameter of between 4 and 6 microns.

14. A method as claimed in claim 13 wherein the diameter of each of the bumps is about 5.35 microns.

15. A method as claimed in claim 14 wherein the bump spacing is about 35 microns.

16. A method as claimed in claim 13 wherein the spacing of the bumps is about 25 to 35 microns.

* * * * *